(12) United States Patent
Daiku et al.

(10) Patent No.: US 12,548,144 B2
(45) Date of Patent: Feb. 10, 2026

(54) INSPECTION APPARATUS, METHOD OF CONTROLLING THE SAME, INSPECTION SYSTEM, AND STORAGE MEDIUM

(71) Applicant: CANON KABUSHIKI KAISHA, Tokyo (JP)

(72) Inventors: Yuki Daiku, Chiba (JP); Masashi Oya, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 300 days.

(21) Appl. No.: 18/350,098

(22) Filed: Jul. 11, 2023

(65) Prior Publication Data

US 2024/0029238 A1    Jan. 25, 2024

(30) Foreign Application Priority Data

Jul. 21, 2022 (JP) ................... 2022-116578
May 16, 2023 (JP) ................... 2023-080923

(51) Int. Cl.
  *G06T 7/00*    (2017.01)
  *G06T 7/11*    (2017.01)
  *G06T 7/30*    (2017.01)

(52) U.S. Cl.
  CPC ............. *G06T 7/001* (2013.01); *G06T 7/11* (2017.01); *G06T 7/30* (2017.01); *G06T 2207/30144* (2013.01)

(58) Field of Classification Search
  CPC .. G06T 7/30; G06T 7/33; G06T 7/001; G06T 2207/30144; B41J 2203/01
  See application file for complete search history.

(56) References Cited

U.S. PATENT DOCUMENTS

| 5,808,735 | A  | * | 9/1998  | Lee ....................... G02B 21/006 |
|           |    |   |         |                          356/369 |
| 2012/0121139 | A1 | * | 5/2012  | Kojima ............... B41F 33/0036 |
|           |    |   |         |                          382/112 |
| 2017/0301099 | A1 | * | 10/2017 | Otomaru ................. G06T 7/344 |
| 2020/0234456 | A1 | * | 7/2020  | Mita ....................... G06V 10/44 |
| 2020/0311894 | A1 | * | 10/2020 | Takahashi ............. G01N 21/88 |
| 2021/0256676 | A1 | * | 8/2021  | Okano ................. G06V 10/761 |
| 2022/0044373 | A1 | * | 2/2022  | Taylor ..................... G06T 5/50 |

FOREIGN PATENT DOCUMENTS

JP    2014117841 A    6/2014

* cited by examiner

*Primary Examiner* — Yuzhen Shen
(74) *Attorney, Agent, or Firm* — ROSSI, KIMMS & McDOWELL LLP

(57) ABSTRACT

The present invention provides an inspection apparatus operable to read an image formed on a printing medium by a printing apparatus and inspect the read image. The inspection apparatus stores image data used at the time of forming the image on a printing medium as a reference image, obtains image data of an image of a printing medium on which the reference image has been formed as a inspection target image and determines whether contents of the inspection target image and contents of the reference image coincide. The inspection apparatus aligns the inspection target image and the reference image according to a result of the determination; and detects a defect in the inspection target image by comparing the aligned inspection target image and reference image.

22 Claims, 18 Drawing Sheets

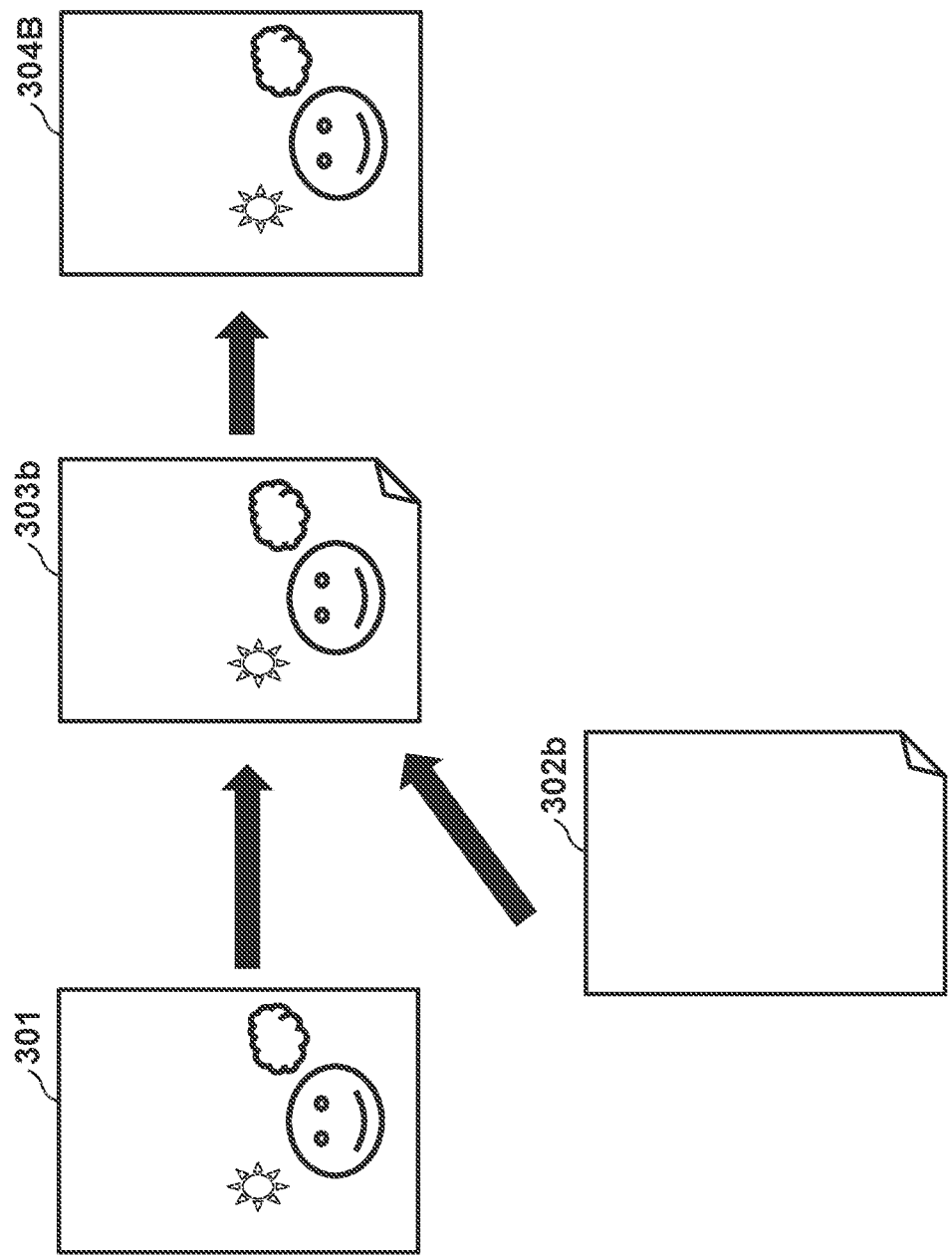

FIG. 11A
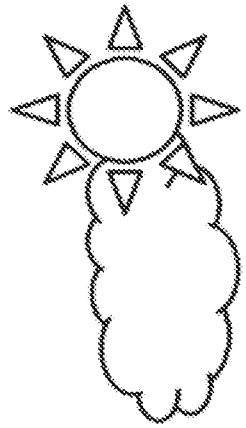
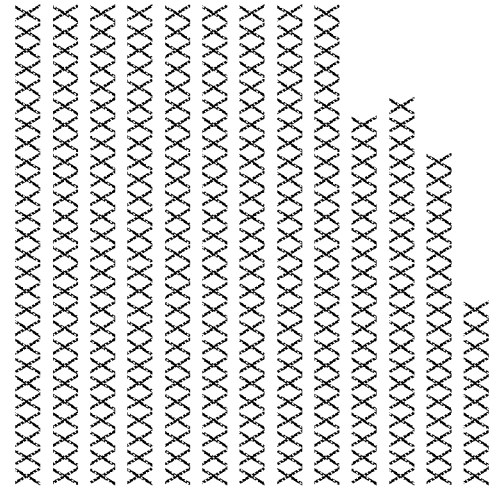
FIG. 11B
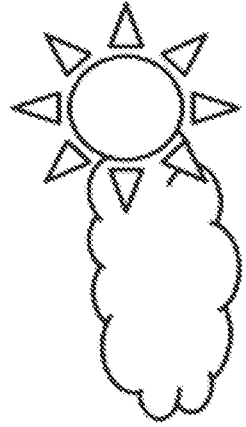
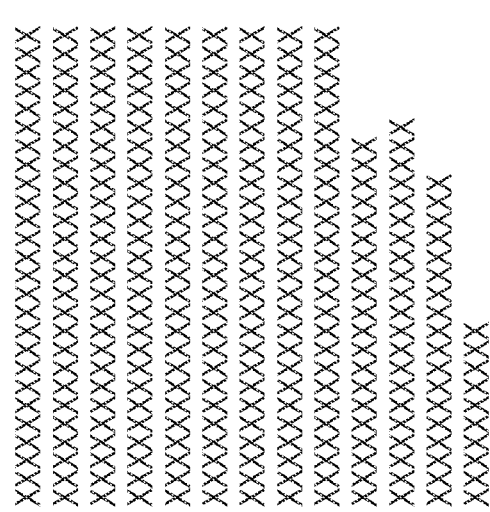

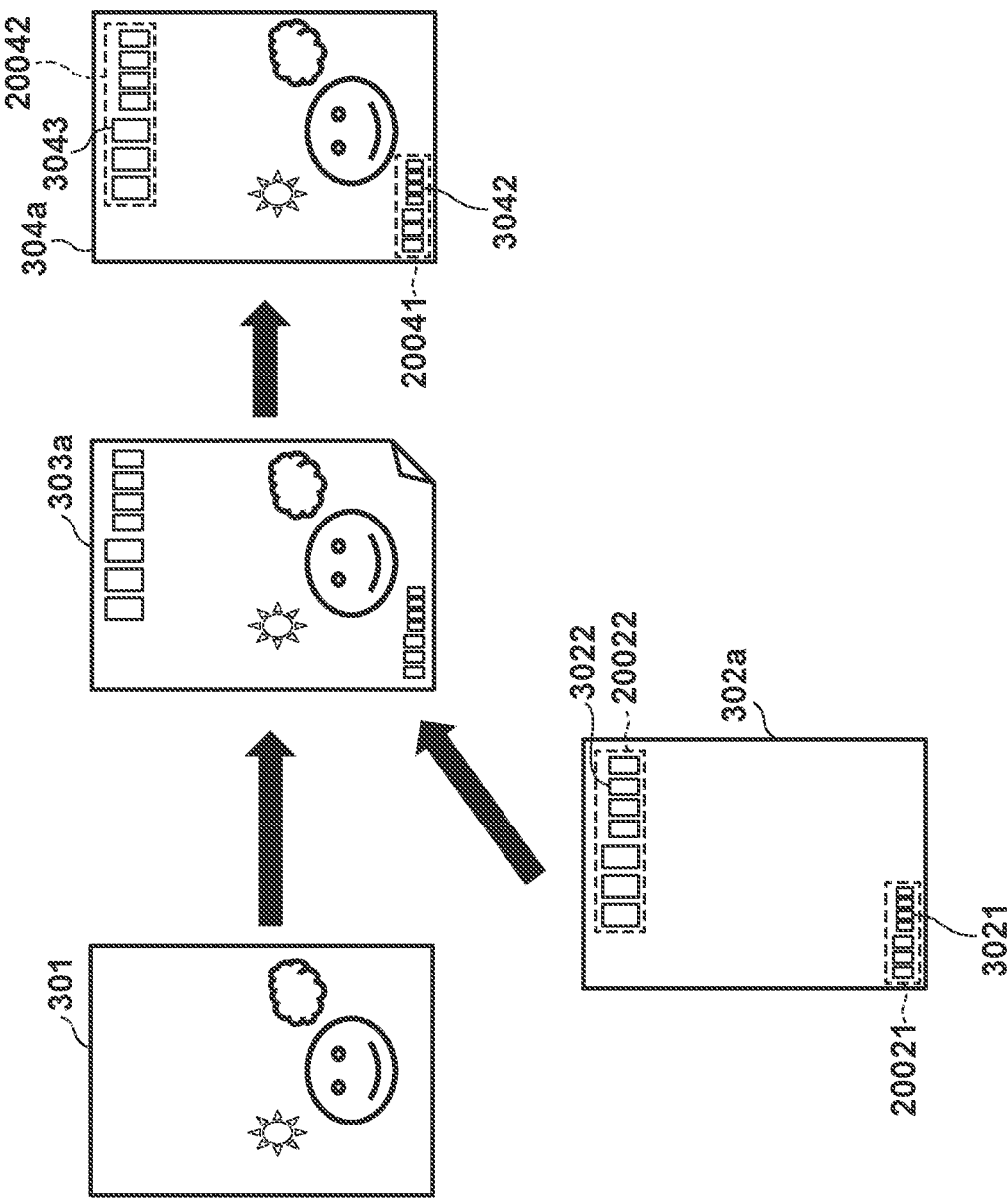

INSPECTION APPARATUS, METHOD OF CONTROLLING THE SAME, INSPECTION SYSTEM, AND STORAGE MEDIUM

BACKGROUND OF THE INVENTION

Field of the Invention

The present invention relates to an inspection apparatus, a method of controlling the same, an inspection system, and a storage medium.

Description of the Related Art

Staining, such as ink, toner, and other coloring agents adhering to unintended places, may occur in print products output from printing apparatuses. Alternatively, a lack of color in which colors end up more faded than intended due to sufficient coloring agents not adhering to places where images are to be formed may occur. So-called printing defects, such as these kinds of staining and lack of color, degrade the quality of print products. Therefore, in order to guarantee the quality of print products, it is important to inspect whether there is a defect in print products.

Visual inspection in which whether there is an aforementioned defect is visually inspected by an inspector requires considerable time and cost, and so, inspection systems for performing automatic inspection without relying on visual inspection have been proposed. There is an inspection method in which an image of a print product is read by a scanner to obtain a scanned image and the scanned image is compared with a reference image in an inspection system in which an inspection is automatically performed. When an image is thus inspected by images being compared with each other, alignment of the images greatly affects the accuracy of the inspection, and so, it becomes important to accurately align the images.

As a common alignment technique, extracting feature points from a reference image and a scanned image and performing alignment by linear transformation (such as affine transformation) is known. However, there are cases where adequate alignment cannot be performed by the alignment by linear transformation, such as in a case where image inspection (RIP image inspection) in which RIP data, which is bitmap data generated from print data, is used as a reference image. In RIP image inspection, local distortions (partial magnification fluctuations) due to conveyance unevenness or stretching of paper are included only in a scanned image, which is an inspection target image. Therefore, the accuracy of alignment of edge portions is lowered. As a technique for aligning such images in which local distortions differ, a technique using free-form deformation (FFD) is known. By using alignment by free-form deformation, alignment of images in which not only shifting and rotation of the entire image but also local magnification and positional displacement are included becomes possible. Japanese Patent Laid-Open No. 2014-117841 discloses a technique in which distortion map information corresponding to such local distortions in a scanned image is obtained and a reference image is distorted based on that information and then compared with the scanned image.

However, in a case that a pattern of a reference image and an inspection target scanned image (inspection target image) do not completely coincide (contents do not coincide), that is, in a case that the inspection target image includes a pattern that is not present in the reference image, the alignment by free-form deformation would sometimes fail. In the free-form deformation, a plurality of control points are arranged in an image. Then, using these control points, coordinates of the control points are optimized so as to reduce a difference between deformed images. Therefore, in a case that an inspection target image includes a pattern that is not present in a reference image, a difference between images is erroneously calculated, and deformation is performed so as to minimize an erroneous difference value. As a result, inspection may be performed in a state in which the reference image and the inspection target image are not aligned, and so the rate of erroneous inspection increases.

SUMMARY OF THE INVENTION

Embodiments of the present disclosure eliminate the above-mentioned issues with conventional technology.

A feature of embodiments of the present disclosure is to provide a technique for preventing erroneous inspection from occurring by determining contents coincidence between an inspection target image and a reference image and, based on whether contents coincide, controlling alignment between the inspection target image and the reference image.

According to embodiments of the present disclosure, there is provided an inspection apparatus operable to read an image formed on a printing medium by a printing apparatus and inspect the read image, the inspection apparatus comprising: one or more memories storing instructions; and one or more processors that execute the instructions to: store image data used at the time of forming the image on a printing medium as a reference image; obtain image data of an image formed on a printing medium; align an inspection target image and the reference image in a state in which a plurality of alignment processes can be executed; set the obtained image data of the image of a printing medium on which the reference image has been formed as the inspection target image, and determine whether contents of the inspection target image and contents of the reference image coincide; control the alignment of the inspection target image and the reference image according to a result of the determination; and detect a defect in the inspection target image by comparing the aligned inspection target image and reference image.

According to embodiments of the present disclosure, there is provided a method of controlling an inspection apparatus operable to read an image formed on a printing medium by a printing apparatus and inspect the read image, the method comprising: storing, in a memory, image data used at the time of forming an image on a printing medium as a reference image; obtaining image data of an image formed on a printing medium; aligning an inspection target image and the reference image in a state in which a plurality of alignment processes can be executed; setting the obtained image data of the image of the printing medium on which the reference image has been formed as the inspection target image, and determining whether contents of the inspection target image and contents of the reference image coincide; controlling the alignment of the inspection target image and the reference image according to a result of the determination; and detecting a defect in the inspection target image by comparing the aligned inspection target image and reference image.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 4 is a diagram illustrating an example of images whose contents coincide.

FIGS. 11A and 11B are diagrams for explaining an example of extracting feature points of images.

FIG. 20 is a schematic diagram illustrating an example in which an image of a region in which contents do not coincide and a non-inspection target region designated by a user are included in a reference image and an inspection target image according to the variation of the second embodiment.

DESCRIPTION OF THE EMBODIMENTS

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

First Embodiment

Figure 1:
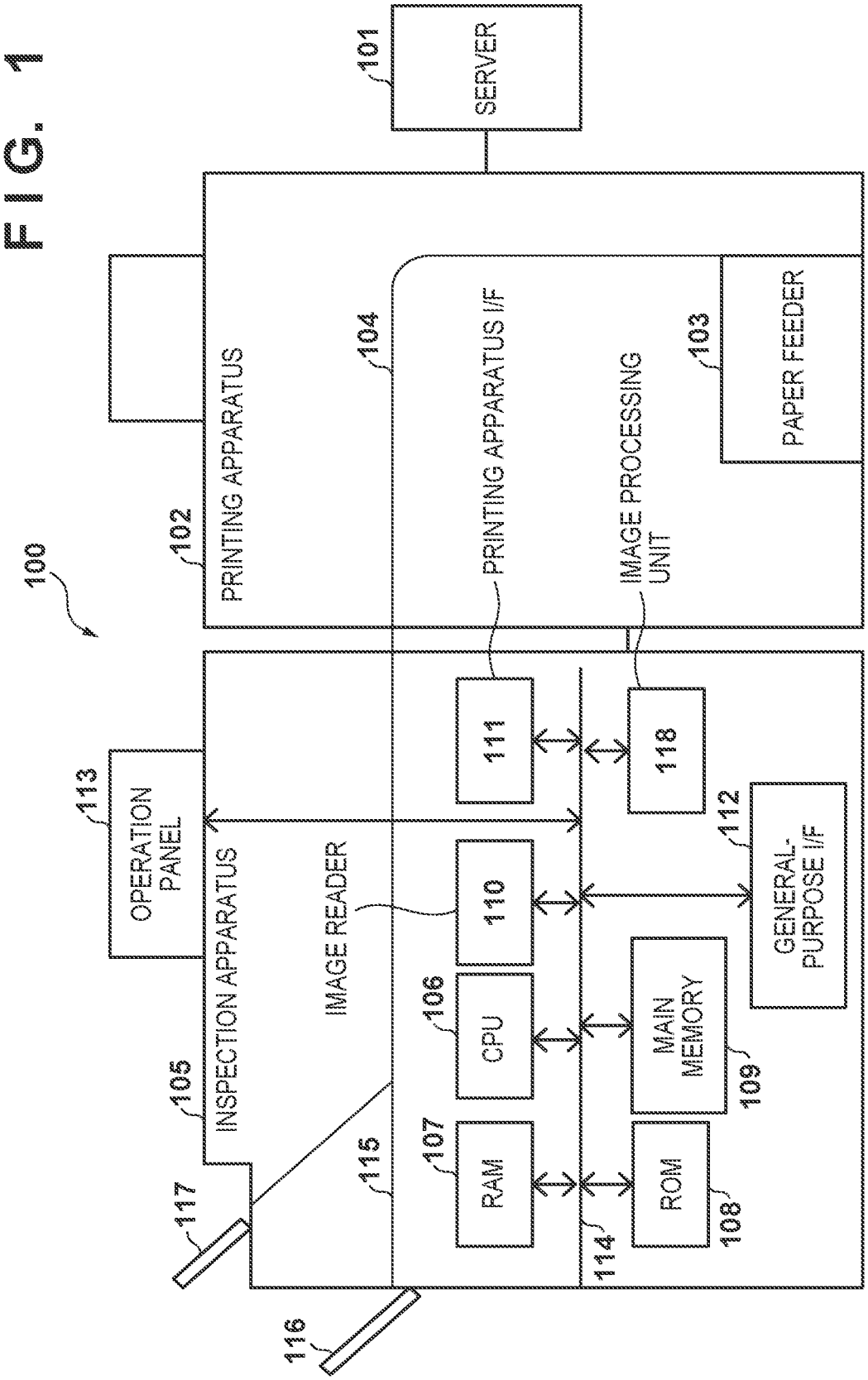
FIG. 1 is a diagram for describing a configuration of an inspection system including an inspection apparatus according to a first embodiment of the present invention.

FIG. 1 is a diagram for describing a configuration of an inspection system 100 including an inspection apparatus 105 according to a first embodiment of the present invention.

In FIG. 1, the inspection system 100 includes a server 101 and a printing apparatus 102 and the inspection apparatus 105. In the inspection system 100, the printing apparatus 102 outputs a print product based on data of a print job generated by the server 101, and the inspection apparatus 105 inspects whether there is a defect in the print product.

The server 101 generates a print job and transmits the generated print job to the printing apparatus 102. A plurality of external apparatuses (not illustrated) are connected to the server 101 via a network so as to be capable of communication, and the server 101 receives print job generation requests and the like from the external apparatuses.

The printing apparatus 102 forms an image on a sheet based on data of the print job received from the server 101. In the first embodiment, a configuration in which the printing apparatus 102 uses an electrophotographic method will be described; however, the configuration is not limited to this, and the configuration may be such that the printing apparatus 102 uses another printing method, such as an offset printing method or an ink jet method. The printing apparatus 102 includes a paper feeder 103. In the paper feeder 103, sheets are set in advance by a user. Based on data of a print job received from the server 101, the printing apparatus 102 conveys a sheet set in the paper feeder 103 along a conveyance path 104, forms (prints) an image on one or both sides of the sheet, and outputs a print product on which the image has been formed to the inspection apparatus 105.

The inspection apparatus 105 includes a CPU 106, RAM 107, a ROM 108, a main memory 109, an image reader 110, a printing apparatus interface (I/F) 111, an image processing unit 118, a general-purpose I/F 112, and an operation panel 113. The CPU 106, the RAM 107, the ROM 108, the main memory 109, the image reader 110, the image processing unit 118, the printing apparatus I/F 111, the general-purpose I/F 112, and the operation panel 113 are connected to each other via a main bus 114. The inspection apparatus 105 includes a conveyance path 115 connected to the conveyance path 104 through which the print product printed by the printing apparatus 102 is conveyed, an output tray 116, and an output tray 117.

The CPU 106 is a processor for controlling the entire inspection apparatus 105. The RAM 107 functions as, for example, a main memory and a working area of the CPU 106. The ROM 108 stores, for example, a plurality of programs to be executed by the CPU 106. The main memory 109 stores, for example, applications to be executed by the CPU 106 and data to be used for image processing. The image reader 110 generates a scanned image of a print product to be inspected output from the printing apparatus 102 by reading one or both sides of the print product. Specifically, the image reader 110 reads one or both sides of a conveyed print product by using one or more reading sensors (not illustrated) arranged near the conveyance path 115. The reading sensors may be provided only on one side or on both sides, on a front side and a back side of print products to be conveyed, in order to simultaneously read both sides. In a configuration in which a reading sensor is provided only on one side of print products, a print product whose one side has been read is conveyed to a double-sided conveyance path (not illustrated) in the conveyance path 115, and after the front and back sides of the print product are reversed, the print product is conveyed to the conveyance path 115 again, and the reading sensor reads the other side.

The image processing unit 118 performs processing for aligning a scanned image, which is an inspection target image, generated by the image reader 110 and a reference image, is registered in advance as a correct image. In addition, the scanned image is compared with the reference image, and it is inspected whether there is a defect in the image of a print product. The image processing unit 118 may be realized in a hardware configuration, or a function thereof may be realized, for example, by the CPU 106 executing a program deployed in the RAM 107. In the following embodiment, an example in which the function of the image processing unit 118 is realized by the CPU 106 executing a program will be described.

The printing apparatus I/F 111 is connected to the printing apparatus 102 and synchronizes processing timings of a print product with the printing apparatus 102, and the inspection apparatus 105 and the printing apparatus 102 notify each other of their respective operation statuses. The general-purpose I/F 112 is, for example, a serial bus interface, such as a USB or IEEE 1394. For example, by connecting a USB memory to the general-purpose I/F 112, data such as logs stored in the main memory 109 can be written into the USB memory and carried out, or data stored in the USB memory can be read into the inspection apparatus 105. The operation panel 113 includes, for example, a display unit, such as a liquid crystal display, and keys. The operation panel 113 functions as a user interface (UI) of the inspection apparatus 105 and displays and communicates the current status and settings to the user. The operation panel 113 also includes a display unit with a touch panel function and can receive an instruction from the user by the user operating a displayed button.

In the inspection apparatus 105, the image reader 110 generates a scanned image of a print product by reading the print product output from the printing apparatus 102 and conveyed through the conveyance path 115. In the inspection apparatus 105, when a scanned image generated by the image reader 110 is a scanned image of a distortion correction chart (hereinafter, simply referred to as a chart), the image processing unit 118 generates distortion information by comparing the scanned image of the chart with a reference image generated as a correct image of the chart. In the inspection apparatus 105, when a scanned image generated by the image reader 110 is an image to be inspected (hereinafter, referred to as an inspection target image), the image processing unit 118 inspects whether there is a defect in the read image of a print product by comparing the inspection target image with a reference image registered in advance as a correct image. A defect of an image of a print product is something that degrades the quality of the print product, such as staining in which coloring agents, such as ink and toner, are adhered to unintended places or a lack of color in which colors end up more faded than they should be due to insufficient coloring agent adhering to places where images are to be formed. The inspection apparatus 105 outputs print products that have passed the inspection to the output tray 116 and outputs print products that have not passed the inspection to the output tray 117. In this manner, only the print products that are guaranteed to have a certain level of quality can be collected in the output tray 116 as products to be delivered.

Figure 2:
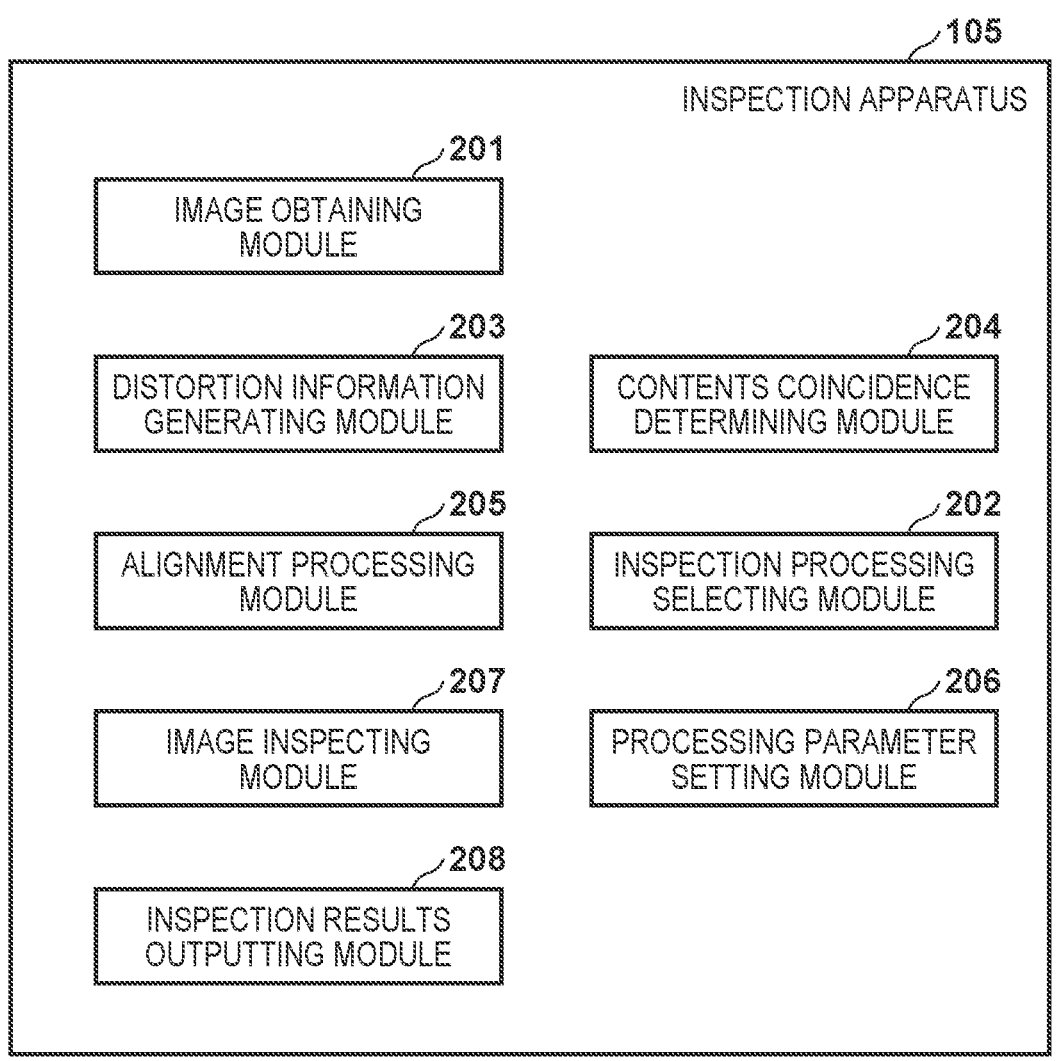
FIG. 2 is a functional block diagram schematically illustrating a functional configuration of the inspection apparatus according to the first embodiment.

FIG. 2 is a functional block diagram schematically illustrating a functional configuration of the inspection apparatus 105 according to the first embodiment.

The inspection apparatus 105 includes an image obtaining module 201, an inspection processing selecting module 202, a distortion information generating module 203, a contents coincidence determining module 204, an alignment processing module 205, a processing parameter setting module 206, an image inspecting module 207, and an inspection results outputting module 208, as software modules. The processing by each of these modules is realized by the CPU 106 executing a program stored in the ROM 108 by deploying the program in the RAM 107.

The image obtaining module 201 obtains a scanned image of an inspection target image or a chart from the image reader 110. The image obtaining module 201 also obtains a reference image registered in advance as a correct image from the RAM 107 or the main memory 109. The inspection processing selecting module 202 selects defect detection processing based on information input by the user to a selection screen (not illustrated) displayed on the operation panel 113. In this selection screen, a type and size of sheet to be used for printing and double-sided printing or one-sided printing are selected. In addition, a type of defect, for example, is selected. The inspection processing selecting module 202 selects defect detection processing for detecting the selected type of defect from among a plurality of defect detection processes that can be executed by the image inspecting module 207. Types of defects include, for example, spot-shaped defects and linear (streak-like) defects. The types of defects are not limited to these, and any type of defect, such as image unevenness or planar defects may be included.

The contents coincidence determining module 204 determines whether contents of a reference image and an inspection target image coincide by comparing the reference image with the inspection target image when alignment by linear transformation, which is performed at the beginning of the inspection processing executed by the inspection apparatus 105, is complete.

Figure 3:
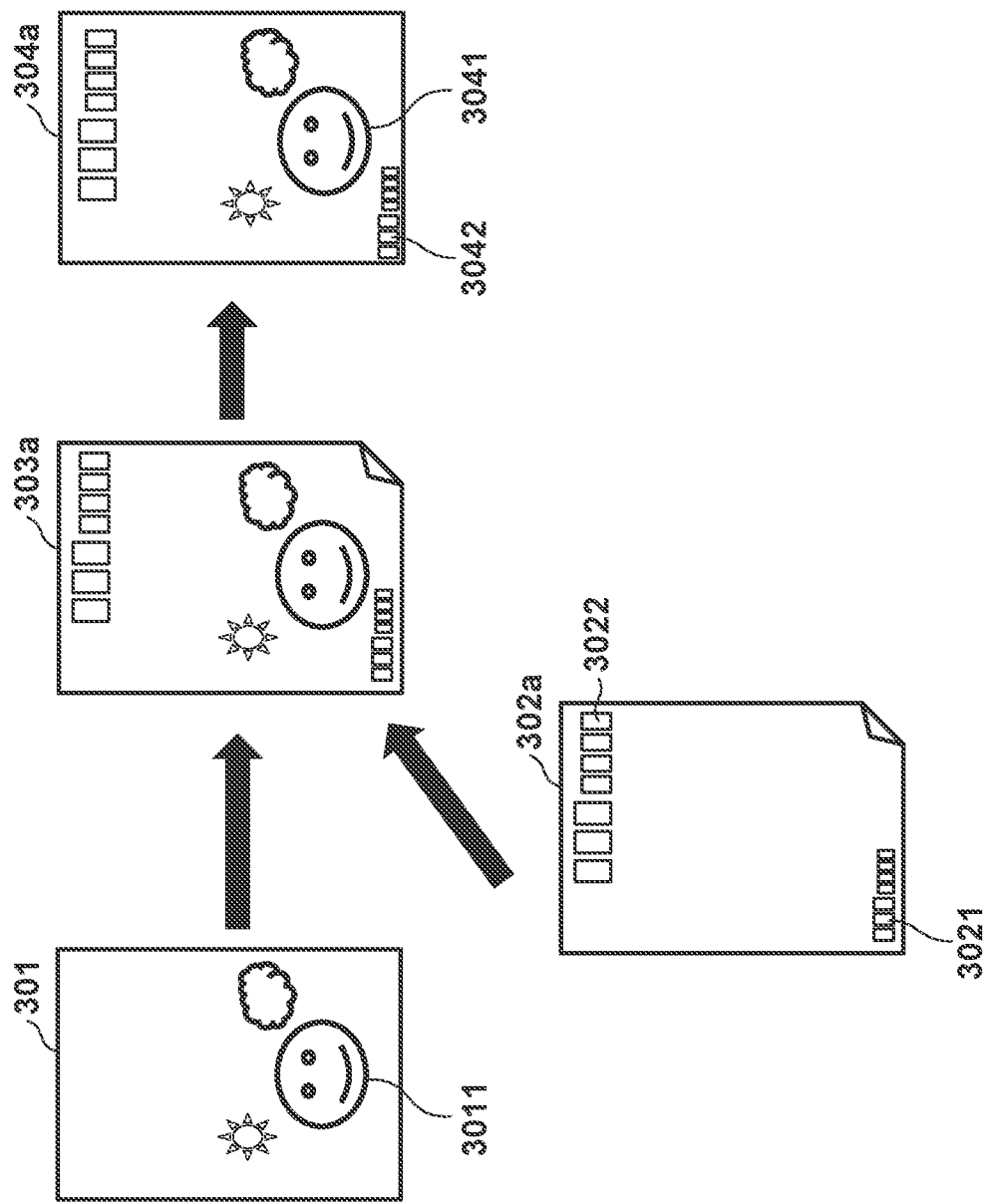
FIG. 3 is a diagram illustrating an example of images whose contents do not coincide.

FIGS. 3 and 4 depict views illustrating examples of schematic diagrams for when contents coincide and for when contents do not coincide in the first embodiment.

FIG. 3 is a diagram illustrating an example of images whose contents do not coincide.

An image 301 represents an image of image data included in a print job and coincides with a reference image in RIP image inspection. A sheet 302a is a sheet used for printing the image 301. In addition, a print product 303a represents a print product produced by printing the image 301 on the sheet 302a. Furthermore, a scanned image 304a represents a scanned image obtained by the image reader 110 reading the print product 303a.

In an inspection method (RIP image inspection) in which image data included in a print job is used as a reference image, the reference image 301 is aligned with the scanned image 304a. In the aforementioned example, the reference image 301 does not include contents 3021 and 3022 included in the sheet 302a. Therefore, in the free-form deformation in the alignment processing to be described later, control points of the same contents 3011 and 3041 are not associated between the reference image and the scanned image, and control points are erroneously associated between different contents 3011 and 3042, and so, the alignment by the free-form deformation fails.

FIG. 4 is a diagram illustrating an example of images whose contents coincide.

Similarly to FIG. 3, the image 301 represents an image of image data included in a print job and coincides with a reference image in RIP image inspection. A print product 303b represents a print product on which the image 301 has been printed on a sheet 302b. A scanned image 304b represents a scanned image obtained by the image reader 110 reading the print product 303b. In FIG. 4, there are no contents that are included in advance in the sheet 302b, and so, the contents of the reference image and the scanned image (inspection target image) coincide. Therefore, in the free-form deformation in the alignment processing to be described later, control points of different contents are not erroneously associated, and so, alignment does not fail in the alignment by the free-form deformation.

As is evident from when FIGS. 3 and 4 are compared, whether contents of a reference image and an inspection target image coincide is based on whether a printed pattern is included in a sheet to be used for printing. Therefore, in the first embodiment, when alignment of a reference image and an inspection target image by the linear transformation performed at the beginning of the inspection processing executed by the inspection apparatus 105 is complete, the reference image and the inspection target image are respectively divided into a plurality of regions, and whether there is a difference in representative values of the corresponding regions of the reference image and the inspection target image is pre-inspected for each of the divided regions. It is determined that contents do not coincide in regions in which it is determined that there is a difference by the pre-inspection. On the other hand, it is determined that contents coincide in regions in which it is determined that there is no difference by the pre-inspection. A detailed method of pre-inspection will be described later.

Returning again to FIG. 2, the alignment processing module 205 executes the alignment processing for each region according to a result of determination by the contents coincidence determining module 204 as to whether contents coincide. This alignment processing will be described in detail later.

The processing parameter setting module 206 sets inspection parameters to be used in the defect detection processing selected by the inspection processing selecting module 202. The inspection parameters include, for example, a filter for emphasizing the type of defect selected by the user and a defect determination threshold for determining a defect. The image inspecting module 207 executes the defect detection processing selected by the inspection processing selecting module 202. The inspection results outputting module 208 displays a result detected by the defect detection processing performed by the image inspecting module 207 on the operation panel 113.

Figure 6:
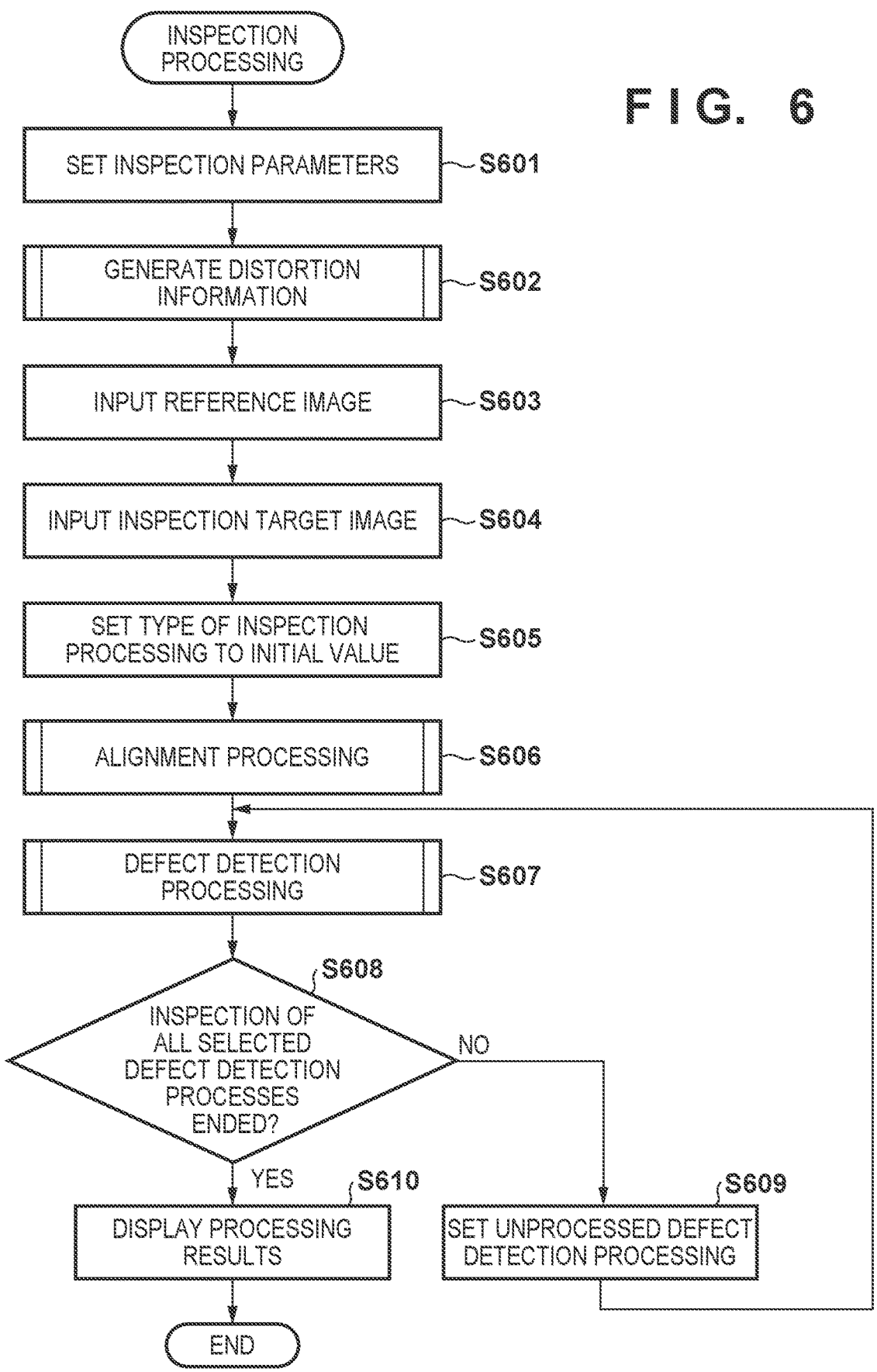
FIG. 6 is a flowchart for explaining a procedure of inspection processing to be executed by the inspection apparatus according to the first embodiment.

FIG. 6 is a flowchart for explaining a procedure of inspection processing to be executed by the inspection apparatus 105 according to the first embodiment. The processing described in this flowchart is realized by the CPU 106 of the inspection apparatus 105 executing a program stored in the ROM 108 by deploying the program in the RAM 107.

First, in step S601, the CPU 106 sets, prior to the inspection processing, inspection settings necessary for inspection of an inspection target image based on information input by the user via a selection screen displayed on the operation panel 113. In step S601, the CPU 106 functions as the inspection processing selecting module 202 and selects one or more defect detection processes based on one or more types of defects selected by the user. The CPU 106 also function as the processing parameter setting module 206 and sets inspection parameters to be used in each of the defect detection processes selected by the inspection processing selecting module 202.

Next, the processing proceeds to step S602, and the CPU 106 functions as the distortion information generating module 203 and generates distortion information. The distortion information generation processing will be described in detail later.

Next, the processing proceeds to step S603, and the CPU 106 functions as the image obtaining module 201 and obtains a registered reference image from the RAM 107 or the main memory 109. However, the reference image is registered prior to the inspection processing being performed. As a method of registering a reference image, for example, a print job transmitted from the server 101 is obtained via the printing apparatus I/F 111, and print data included in the print job is rendered into a bitmap and stored in the RAM 107 or the main memory 109.

Next, the processing proceeds to step S604, and the CPU 106 functions as the image obtaining module 201 and obtains an inspection target image (scanned image) by the image reader 110 optically reading an image of a print product to be inspected. A configuration may be such that in step S604, a scanned image generated by a print product being read in advance by the image reader 110 and held in the main memory 109 is obtained as an inspection target image.

Next, the processing proceeds to step S605, and the CPU 106 selects one defect detection process to be executed from among one or more defect detection processes selected by the inspection processing selecting module 202 in step S601. In step S605, defect detection processing that is registered in advance to be preferentially executed or defect detection processing corresponding to the type of defect initially selected by the user, for example, is selected.

Then, the processing proceeds to step S606, and the CPU 106 functions as the alignment processing module 205 and executes alignment processing, thereby aligning the inspection target image and the reference image. The alignment processing is performed according to a result of determination by the contents coincidence determining module 204 for each region obtained by dividing each image. The alignment processing will be described in detail later.

Then, the processing proceeds to step S607, and the CPU 106 functions as the image inspecting module 207 and executes defect detection processing. Next, the processing proceeds to step S608, and the CPU 106 determines whether execution of all the defect detection processes selected in step S601 has ended, and when the execution of all the selected defect detection processing has ended, the processing proceeds to step S610; otherwise, the processing proceeds to step S609, and the CPU 106 selects one defect detection process to be executed from unexecuted defect detection processes and returns to step S607. The defect detection processing will be described in detail later.

Figure 7:
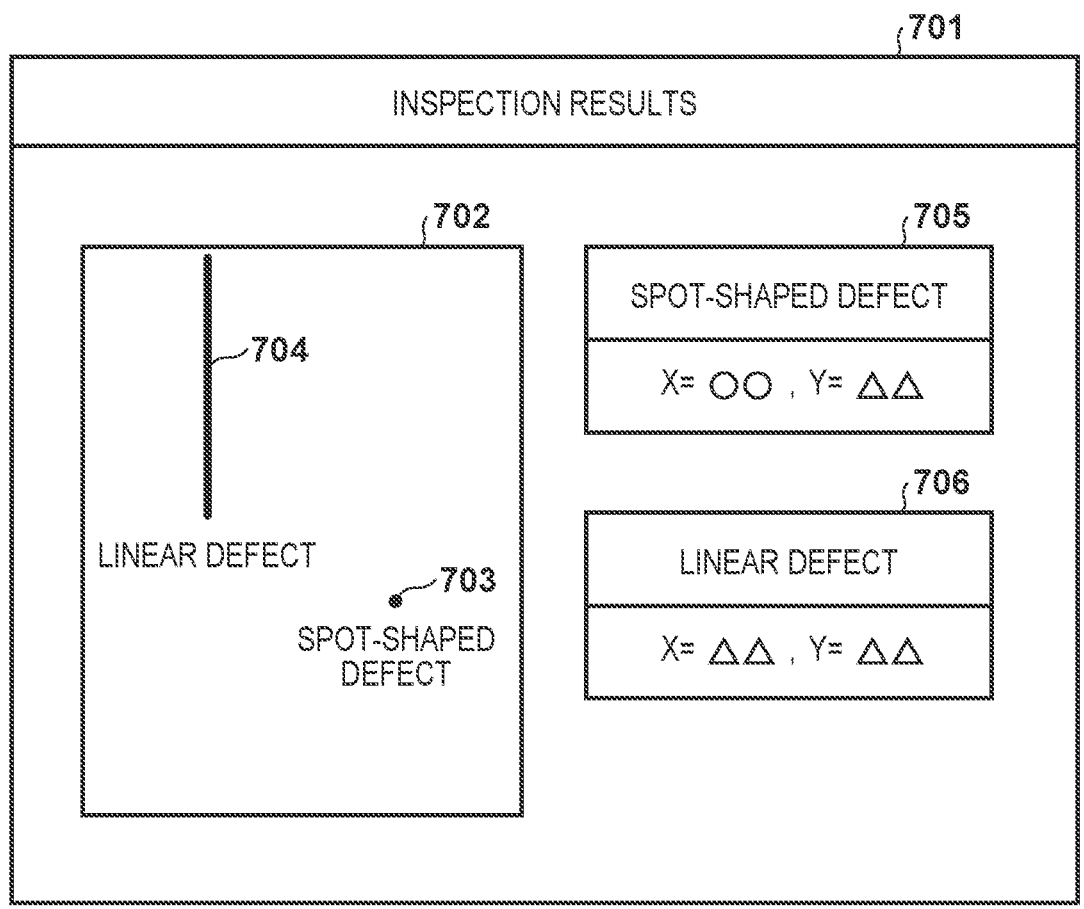
FIG. 7 depicts a view illustrating an example of an inspection results display screen to be displayed on an operation panel of the inspection apparatus according to the first embodiment.

In step S610, the CPU 106 functions as the inspection results outputting module 208 and presents inspection results, for example, displays a results display screen 701 of FIG. 7 on the operation panel 113.

FIG. 7 depicts a view illustrating an example of the inspection results display screen 701 to be displayed on the operation panel 113 of the inspection apparatus 105 according to the first embodiment.

The inspection results display screen 701 displays an inspection target image 702. For example, characters "spot-shaped defect" are displayed in a vicinity of a defect 703, which has been determined to be a spot-shaped defect. In addition, characters "linear defect" are displayed in a vicinity of a defect 704, which has been determined to be a linear defect. Further, as illustrated in areas 705 and 706, coordinates indicating position at which the respective defects in the inspection target image 702 are detected are also displayed. A method of displaying inspection results is not limited to the above-described method and, for example, may be any presentation method so long as the user can recognize by which of a plurality of defect detection processes a detected defect has been detected, such as a presentation method in which each type of defect being displayed in a different color. When the processing of step S610 is thus ended, the inspection processing ends.

Figure 8:
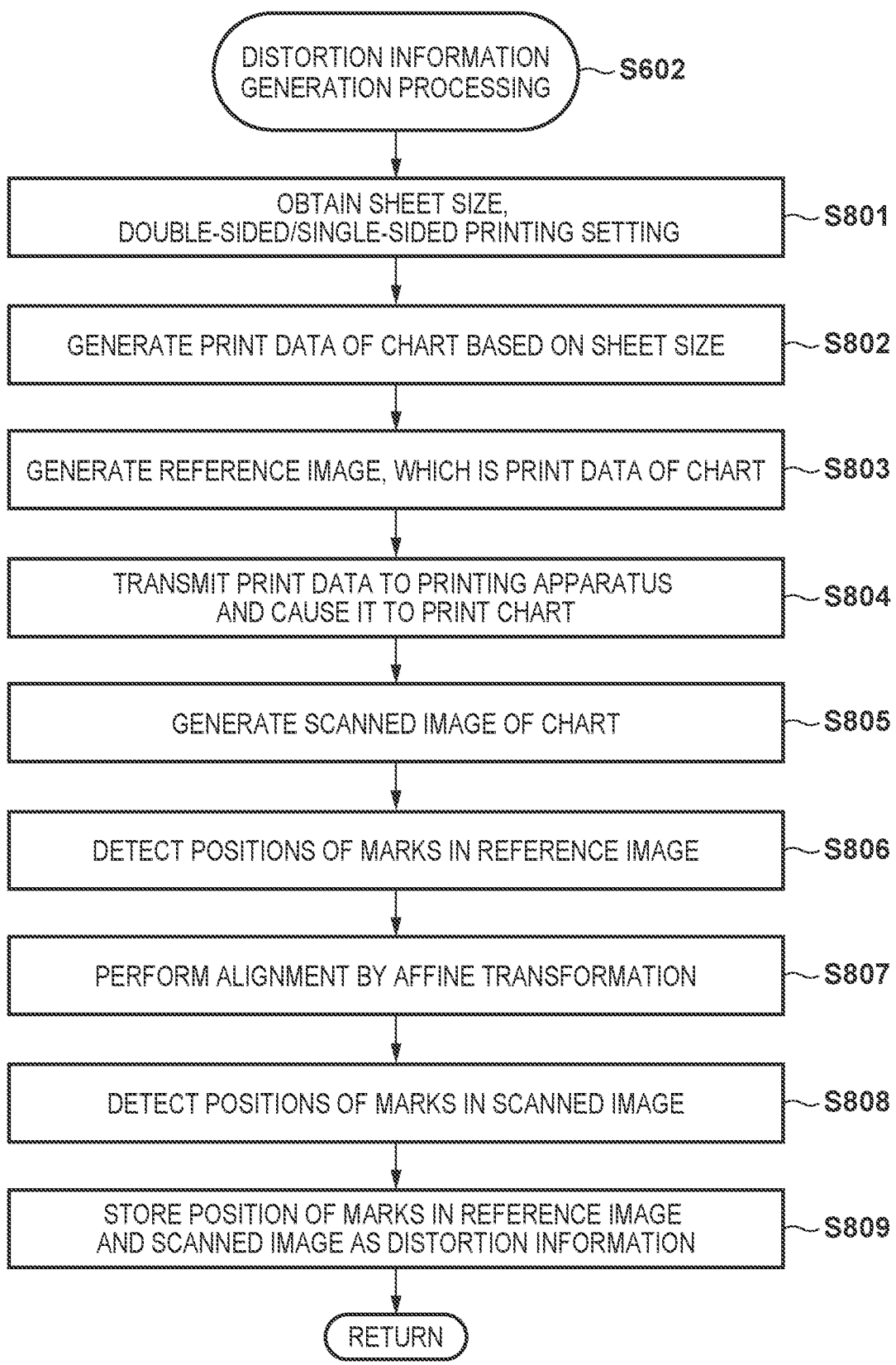
FIG. 8 is a flowchart for explaining a procedure of distortion information generation processing of step S602 of FIG. 6.

FIG. 8 is a flowchart for explaining a procedure of the distortion information generation processing of step S602 of FIG. 6. In the processing described in this flowchart, the CPU 106 functions as the distortion information generating module 203.

First, in step S801, the CPU 106 obtains a type and size of sheet to be used for printing and a double-sided/single-sided printing setting selected by the inspection processing selecting module 202. Next, the processing proceeds to step S802, and the CPU 106 generates print data of a distortion correction chart 901 as illustrated in FIG. 9 based on the sheet size obtained in step S801.

Figure 9:
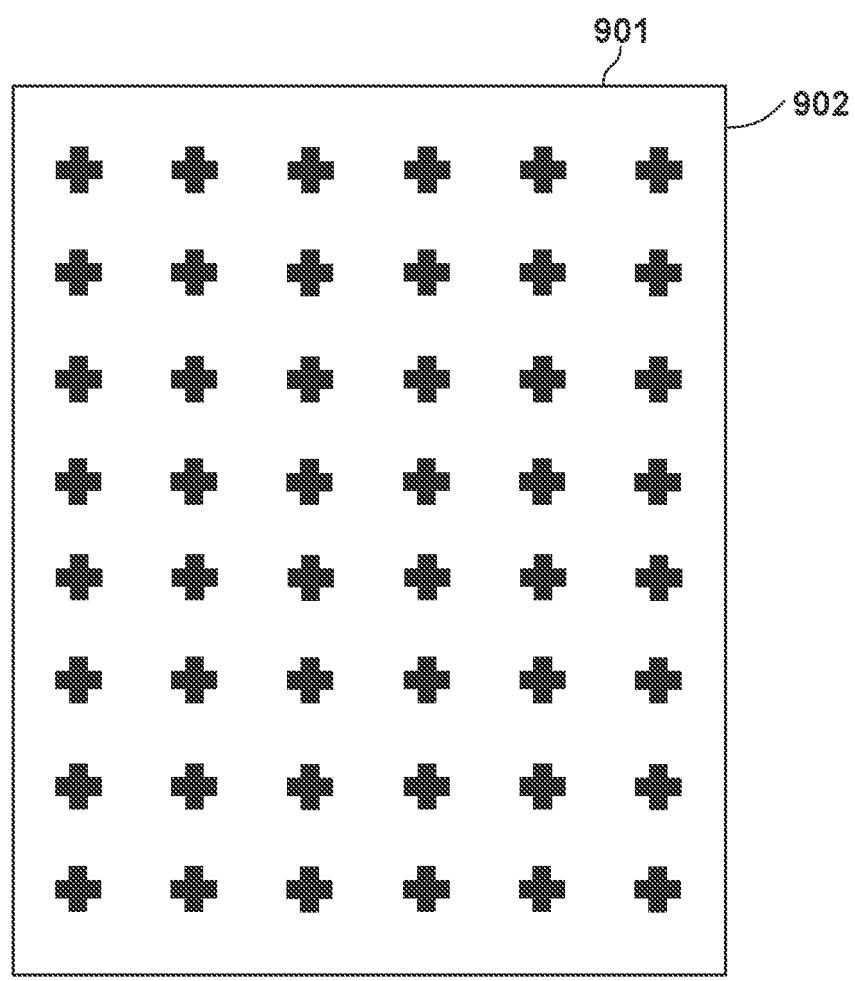
FIG. 9 is a diagram illustrating an example of a distortion correction chart according to an embodiment.

FIG. 9 is a diagram illustrating an example of the distortion correction chart 901 according to an embodiment.

In the distortion correction chart 901, marks 902 are arranged in a grid pattern across the entire surface of a sheet. When a distance between the marks 902 is decreased, it is possible to calculate more accurate distortion information. The number of marks 902 may be changed depending on the sheet size. In FIG. 9, a cross is used as the shape of the marks; however, the shape is not limited and may be, for example, a square.

Next, the processing proceeds to step S803, and the CPU 106 generates a reference image from the generated print data of the distortion correction chart 901. Next, the processing proceeds to step S804, and the CPU 106 transmits the generated print data of the chart to the printing apparatus 102 via the printing apparatus I/F 111 and causes the printing apparatus 102 to print the chart 901 on a sheet corresponding to the type and size of sheet obtained in step S801. At this time, in a case of a double-sided printing setting, the chart 901 is printed on both sides of the sheet. Then, the processing proceeds step S805, the CPU 106 generates a scanned image of the chart 901 by the image reader 110 reading a print product on which the chart 901 has been printed and conveyed from the printing apparatus 102 to the conveyance path 115. Then, the processing proceeds to step S806, and the CPU 106 detects positions of the marks from the reference image of the chart generated in step S803. A method of detecting the positions of the marks is not particularly limited, and examples include a method in which pixel regions of the marks are extracted by template matching and centers of gravity of the pixel regions are calculated and set as the positions of the marks. At this time, an index, such as a mark being at a j-th row and an i-th column from the upper left of the sheet, is simultaneously obtained based on the position of the mark such that each mark can be identified.

Next, the processing proceeds to step S807, and the CPU 106 aligns the scanned image of the chart generated in step S805 to the reference image by affine transformation. A method of the alignment includes, for example, an alignment method in which an affine matrix is calculated such that a sum of Euclidean distances between the positions of the marks is minimized and affine transformation is performed. Affine transformation is a deformation in which the entire image is rotated, translated, scaled, and sheared, and so, it is possible to align the scanned image to the reference image while maintaining local distortions in the scanned image. When the chart is printed on both sides, alignment is performed for each of the front and back sides of the print product.

Then, the processing proceeds to step S808, and the CPU 106 detects the positions of the marks and calculates the indices of the marks in a manner similar to step S806, in the scanned image aligned in step S807. In a case of double-sided printing, the processing is performed for each of the front and back sides. Then, the processing proceeds to step S809, and the CPU 106 stores the positions of the marks and the indices indicating the positions from the upper left of the sheet of the reference image and the positions of the marks and the indices indicating the positions from the upper left of the sheet of the aligned scanned image, obtained in steps S806 and S808, respectively, in the main memory 109 as distortion information. This concludes the distortion information generation processing.

Figure 10:
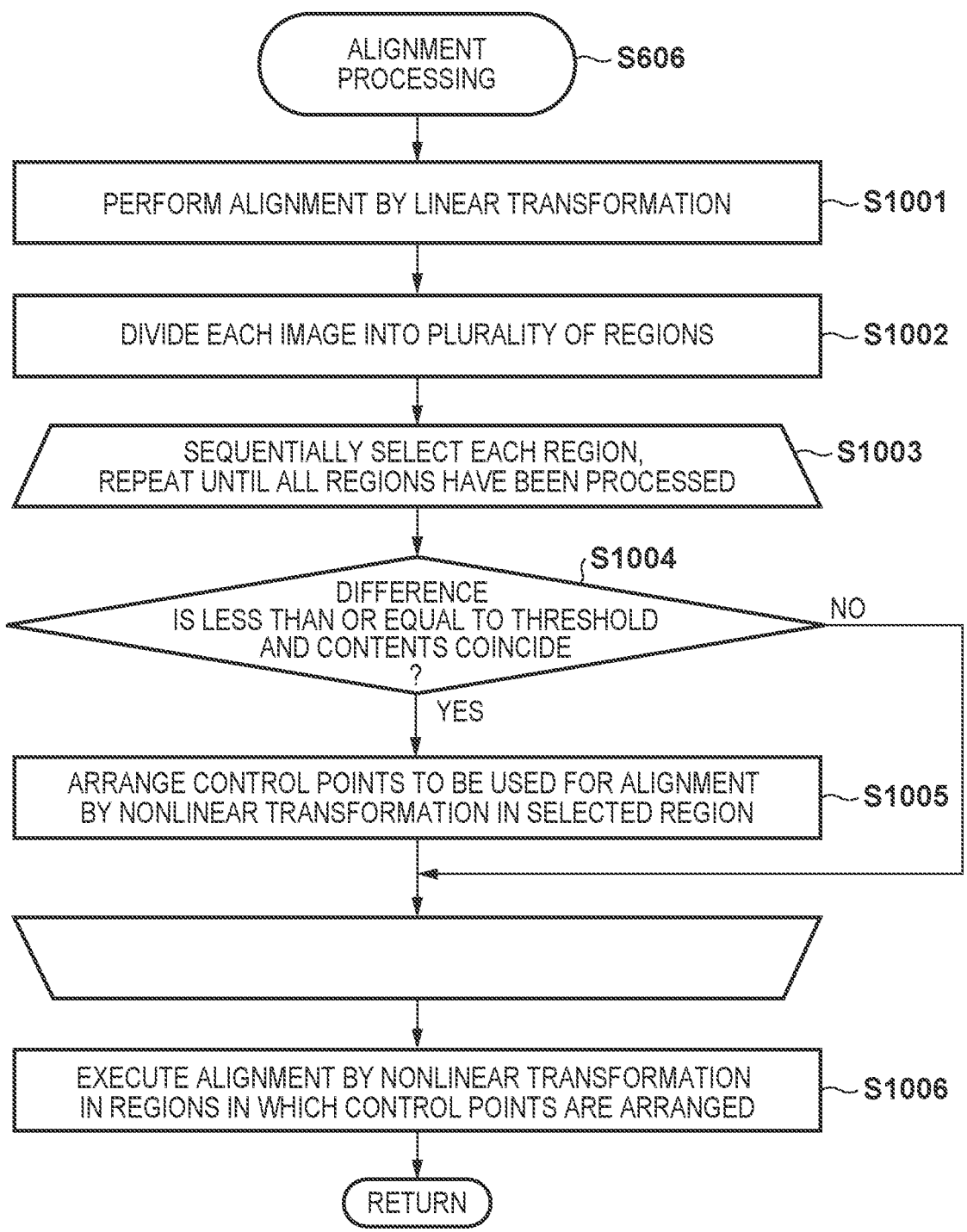
FIG. 10 is a flowchart for explaining a procedure of alignment processing of step S606 of FIG. 6.

FIG. 10 is a flowchart for explaining a procedure of the alignment processing of step S606 of FIG. 6. The purpose of the alignment processing is to reduce the positional displacement between a reference image and an inspection target image and to improve the accuracy of difference detection by image inspection. In the first embodiment, the alignment processing module 205 can perform alignment processing by linear transformation and alignment processing by nonlinear transformation for correcting local distortions and switches the alignment processes depending on the contents of the reference image and the inspection target image. The alignment processing by nonlinear transformation for correcting local distortions includes, for example, the free-form deformation (FFD), thin plate splines (TPS), and a landmark LDDMM method. In the following embodiment, an example in which the free-form deformation is used will be described. A large distortion tendency is corrected using the distortion information generated in step S602 of FIG. 6. The alignment processing to be described later is realized by the CPU 106 executing a program stored in the ROM 108 by deploying the program in the RAM 107. Details of the processing in each step are described below.

In step S1001, the CPU 106 functions as the alignment processing module 205 and performs alignment by linear transformation (affine transformation). As in the above-described step S807, in the alignment by linear transformation, feature points to be references between the reference image and the inspection target image are extracted, and the feature points indicating the same contents are associated. Furthermore, an affine matrix is calculated such that the sum of Euclidean distances between the feature points is minimized and affine transformation is performed. In the first embodiment, alignment by linear transformation is performed using an outline as a feature point.

FIGS. 11A and 11B are diagrams for explaining an example of extracting feature points of images.

When an outline of a sheet is used as a feature point to be detected in an image as in FIG. 11A, edges of the outermost outline of an inspection target range 11011 of an image 1101 are extracted based on a known edge detection method (e.g., a Canny method), and intersection points 11012 of the edges are defined as feature points. The feature points to be used in the alignment by linear transformation are one example and are not limited to the outline of the sheet. For example, as in an inspection target range 11021 of FIG. 11B, a configuration may be such that markers 11023 for alignment are arranged and positions of these markers 11023 are set as feature points. Further, a configuration may be such that edge detection is performed in the image, and feature points are set from the detected edges. Furthermore, it is needless to say that the outline of the sheet and the edge information of the image may be used in combination as the feature points.

Next, the processing proceeds to step S1002, and the CPU 106 functions as the contents coincidence determining module 204 and divides each image into a plurality of regions.

Figure 5A:
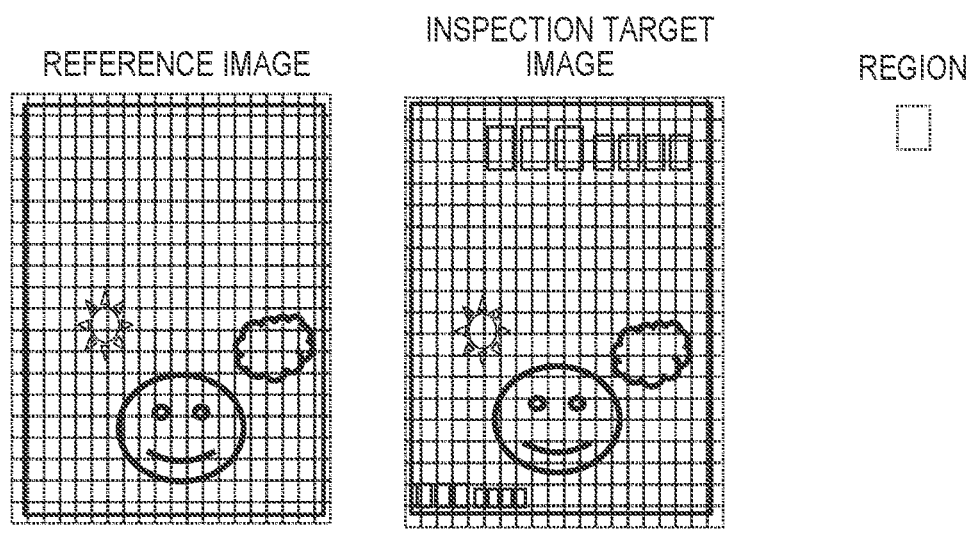
FIG. 5A is a schematic diagram in which a reference image and an inspection target image are each divided into a plurality of regions in the first embodiment.

FIG. 5A illustrates a schematic diagram in which a reference image and an inspection target image are each divided into a plurality of regions in the first embodiment. In the first embodiment, the reference image and the inspection target image are each divided into regions of a size that is vertically and horizontally one twentieth of the number of pixels of the respective images. For example, when the number of vertical and horizontal pixels of each image is 4800 pixels, each image is divided into a total of 57600 (=240×240) regions, 240 regions arranged vertically and horizontally. Then, a representative value corresponding to each region is calculated. Regarding the representative value corresponding to a region in the first embodiment, RGB data for each pixel of each image is converted into a luminance value using a known color conversion method. The conversion into a luminance value is performed for each pixel, and an average value of the luminance values of the pixels is used as the representative value. When division into a plurality of regions and calculation of a representative value of each region are thus complete, the processing proceeds to step S1003. The number of regions into which the images are divided is one example and is not limited. The larger the number of regions, the more accurate the determination as to whether the contents coincide; however, the larger the number of regions, the longer it takes for the determination processing, and so, the cost increases. For example, it is desirable to set the size of regions such that the number of regions will not affect the number of copies that can be printed by the printing apparatus 102 per unit time.

Next, the processing proceeds to step S1003, and the CPU 106 functions as the contents coincidence determining module 204 and sequentially selects each region. Then, in step S1004, it is determined whether the contents of the reference image and the inspection target image coincide in the selected region, and it is determined whether to arrange control points for nonlinear alignment. The selection of regions is performed sequentially, and step S1003 to step S1005 are repeatedly performed until determination of all the regions is complete. When the selection and determination of all the regions and the arrangement of control points are complete, the processing proceeds to step S1006.

Next, the processing performed in step S1003 to step S1005 will be described.

In step S1004, the CPU 106 functions as the contents coincidence determining module 204 and determines whether the contents of the reference image and the inspection target image coincide in the region selected in step S1003. This determination is made based on whether a difference between the representative values corresponding to the selected region exceeds a threshold stored in advance in the ROM 108. When the difference between the representative values is below the threshold, it is determined that the contents of the selected region coincide, and the processing proceeds to step S1005. Meanwhile, when the difference between the representative values exceeds the threshold, it is determined that the contents of the selected region do not coincide, and the processing proceeds to step S1003, and the next region is selected. The threshold is determined in consideration of print product density unevenness that occurs in the printing apparatus 102 and reading noise that occurs in the image reader 110. For example, assume that when a reference image and an inspection target image are obtained as 8-bit data, a difference between the representative values due to print product density unevenness and reading noise is 24 at maximum. In such a case, the threshold is set to 24, and when a difference between the representative values of the regions exceeds 24, it is determined that there is a difference that exceeds fluctuations caused by the printing apparatus 102 or the image reader 110 and that there is a printed pattern on the sheet that has been used for printing.

In the above description, an example in which one fixed threshold is provided has been described, however, the present invention is not limited to the above example. The density unevenness of the printing apparatus 102 varies with time due to factors, such as temperature, humidity, and the number of consecutively printed sheets. Therefore, a configuration may be taken such that when a print product is generated, the density unevenness that occurs in the current state of the printing apparatus 102 is obtained or estimated, and the threshold is appropriately updated such that the threshold takes the current density unevenness into consideration. The print product density unevenness and the reading noise also varies depending on the amount of coloring agent corresponding to image data to be printed. Therefore, a configuration may be taken such the amount of coloring agent corresponding to a region is obtained or estimated, and the threshold is changed according to the amount of the coloring agent.

Furthermore, a method of determining a threshold for each region is not limited to the amount of coloring agent. A threshold may be determined from a histogram of luminance values in a region using the known Otsu's method.

In step S1005, the CPU 106 functions as the contents coincidence determining module 204 and arranges in the selected region control points to be used for alignment by nonlinear transformation.

Figure 5B:
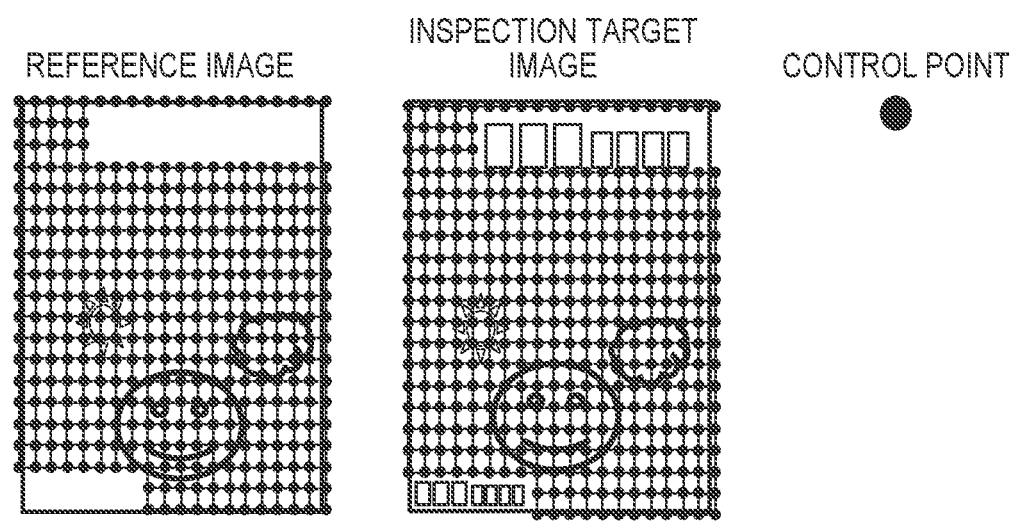
FIG. 5B is a schematic diagram illustrating a state in which control points are arranged in a reference image and an inspection target image in the first embodiment.

FIG. 5B is a schematic diagram illustrating a state in which control points are arranged in each image. As illustrated in FIG. 5B, when the contents are different between the reference image and the inspection target image, the control points to be used for alignment by nonlinear transformation are arranged only in the regions in which a difference between the representative values of the regions is less than the threshold, that is, in the regions in which the contents coincide.

When the determination of all the regions and the processing for arranging the control points are thus complete, the processing proceeds to step S1006, and the CPU 106 functions as the alignment processing module 205, reads the distortion information generated by the distortion information generation processing in step S602, and performs alignment by nonlinear transformation only on the regions in which the control points have been arranged in step S1005. In step S1006, the distortion information generated by the distortion information generation processing is read, and in the regions in which it is determined that the contents coincide, control point coordinates are calculated based on the distortion information such that the difference between corresponding control points of the reference image and the inspection target image is reduced. Finally, the inspection target image is deformed by nonlinear transformation based on the calculated control point coordinates. When the deformation processing of all the regions in which the control points have been arranged is thus complete, the alignment processing module 205 ends the alignment processing.

As described above, in the first embodiment, in the alignment by nonlinear transformation based on the distortion information, the alignment in which the control points are used is implemented only in the regions in which a difference between the representative values of corresponding regions is small and in which the contents coincide. Therefore, it is possible to suppress deformation of the inspection target image into an incorrect shape due to erroneous association between control points.

Figure 12:
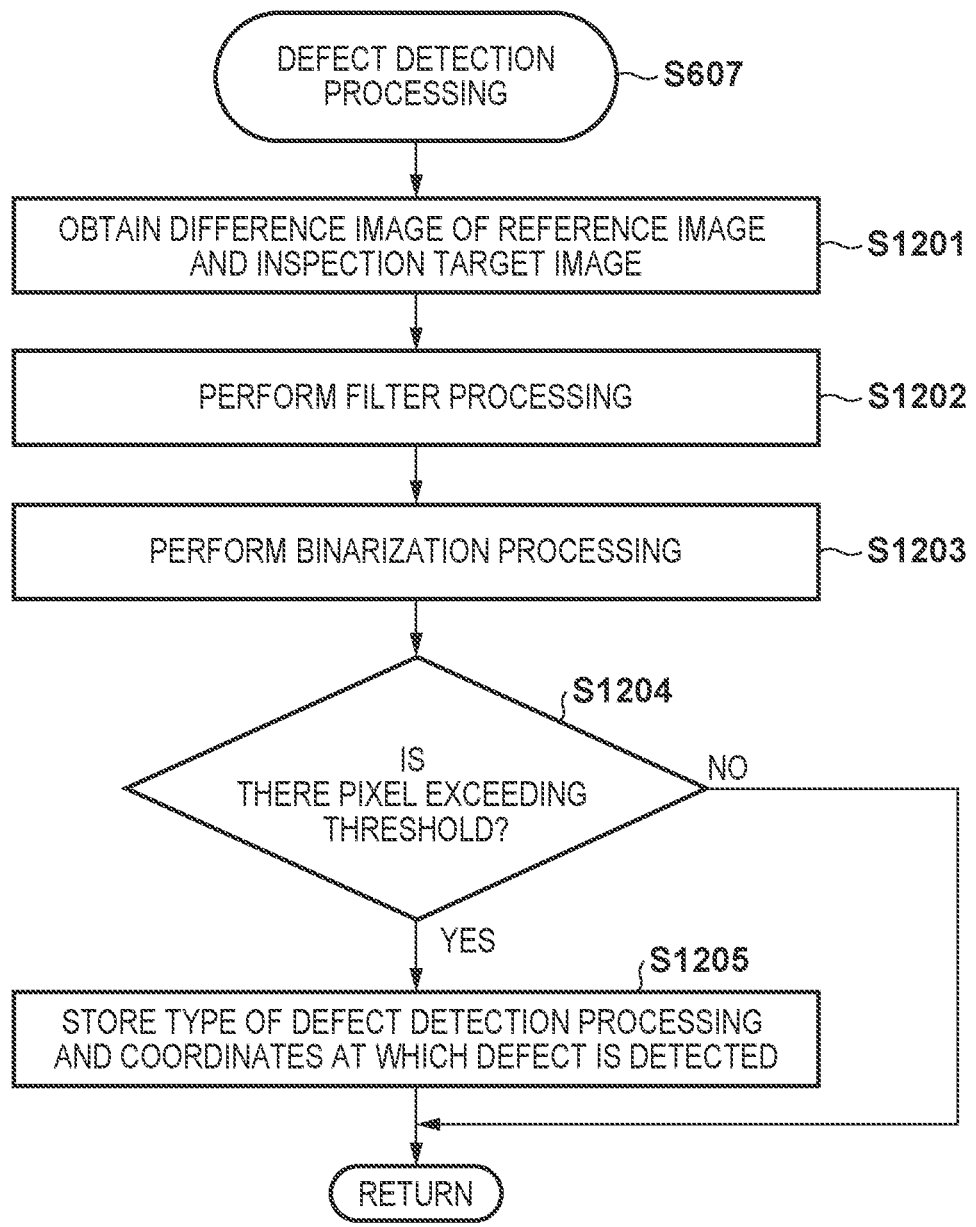
FIG. 12 is a flowchart for explaining a procedure of defect detection processing of step S607 of FIG. 6.

FIG. 12 is a flowchart for explaining a procedure of the defect detection processing of step S607 of FIG. 6. In the processing described in this flowchart, the CPU 106 executes the processing by functioning as the image inspecting module 207.

First, in step S1201, the CPU 106 obtains a difference image by comparing the aligned reference image and inspection target image. The difference image is, for example, an image generated by comparing each pixel of the reference image and the inspection target image and obtaining a pixel value, such as a difference value between density values for each of R, G, and B, for each pixel. A method of obtaining the difference may be changed depending on the type of defect detection processing set in step S605 or step S609.

Next, the processing proceeds to step S1202, and the CPU 106 performs filtering processing for emphasizing a particular shape in the difference image obtained in step S1201.

Figure 13A:
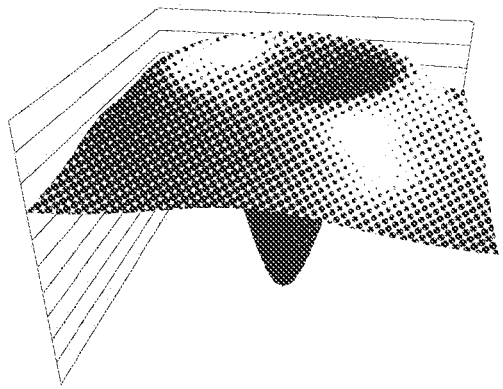
FIG. 13A is a diagram illustrating an example of a filter for emphasizing spot-shaped defects.
Figure 13B:
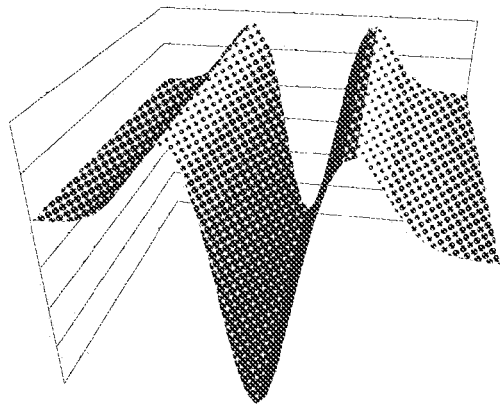
FIG. 13B is a diagram illustrating an example of a filter for emphasizing linear defects.

FIG. 13A depicts a view illustrating a filter for emphasizing a spot-shaped defect, and FIG. 13B depicts a view illustrating a filter for emphasizing a linear defect. These filters are changed depending on the type of defect detection processing set in step S605 or step S609. For example, when the defect detection processing set in step S605 or step S609 is defect detection processing for detecting a spot-shaped defect, the filtering processing of step S1202 is performed using the filter of FIG. 13A. Meanwhile, when the defect detection processing set in step S605 or step S609 is defect detection processing for detecting a linear defect, the filtering processing of step S1202 is performed using the filter of FIG. 13B.

Next, the processing proceeds to step S1203, and the CPU 106 functions as the image inspecting module 207 and performs binarization processing on the filtered difference image. Thus, an image (hereinafter, referred to as a binarized difference image) in which a pixel value of a pixel in which a difference value exceeds the aforementioned defect determination threshold is set to "1" and a pixel value of a pixel less than or equal to the aforementioned defect determination threshold is set to "0" is generated. Then, in step S1204, the CPU 106 determines whether there is a pixel exceeding the defect determination threshold using the binarized difference image. In step S1204, in a case that it is determined that there is no pixel exceeding the defect determination threshold, the CPU 106 deems that there is no defective portion and ends the defect detection processing. Meanwhile, in step S1204, in a case where it is determined that there is a pixel exceeding the defect determination threshold, the processing proceeds to step S1205, and the CPU 106 stores information related to the detected defect in the RAM 107 or the main memory 109. Specifically, the CPU 106 stores in the RAM 107 or the main memory 109 the type of defect detection processing by which the defective portion has been detected and the coordinates of the defect portion in association. Then, the defect detection processing ends.

The defect detection processing of FIG. 12 is a subroutine of step S607 of FIG. 6, which describes a flow of one defect detection process. Therefore, each time the subroutine of step S607 is called, the selected type of defect detection processing is executed. In step S1202, the filter processing is performed using a filter corresponding to the selected type of defect detection processing.

In the first embodiment, a description has been given using defect detection processing for detecting a spot-shaped defect and defect detection processing for detecting a linear defect as examples of defect detection processing; however, the types of defect detection processing are not limited to these. That is, any defect detection processing is applicable to the present invention so long as the user can detect a desired defect, and the type thereof is not limited.

As described above, by virtue of the first embodiment, alignment by distortion correction processing is performed only in the regions in which the contents of the reference image set in advance by the user and the inspection target image coincide. By the above-described processing, it is possible to suppress error in the processing for aligning the reference image and the inspection target image and to suppress the occurrence of erroneous inspection.

Variation of First Embodiment

In the first embodiment, the reference image and the inspection target image are divided into a plurality of regions, and it is determined whether the contents coincide for each divided region. However, units for determining contents coincidence are not limited to the above-described example. For example, a configuration may be taken such that a determination result is calculated for the entire inspection target image. That is, a configuration may be taken such that in a case where it is determined by the above-described determination processing that the contents do not coincide for any one of the plurality of regions, the alignment processing by nonlinear transformation is skipped for the entire inspection target image.

Figure 14:
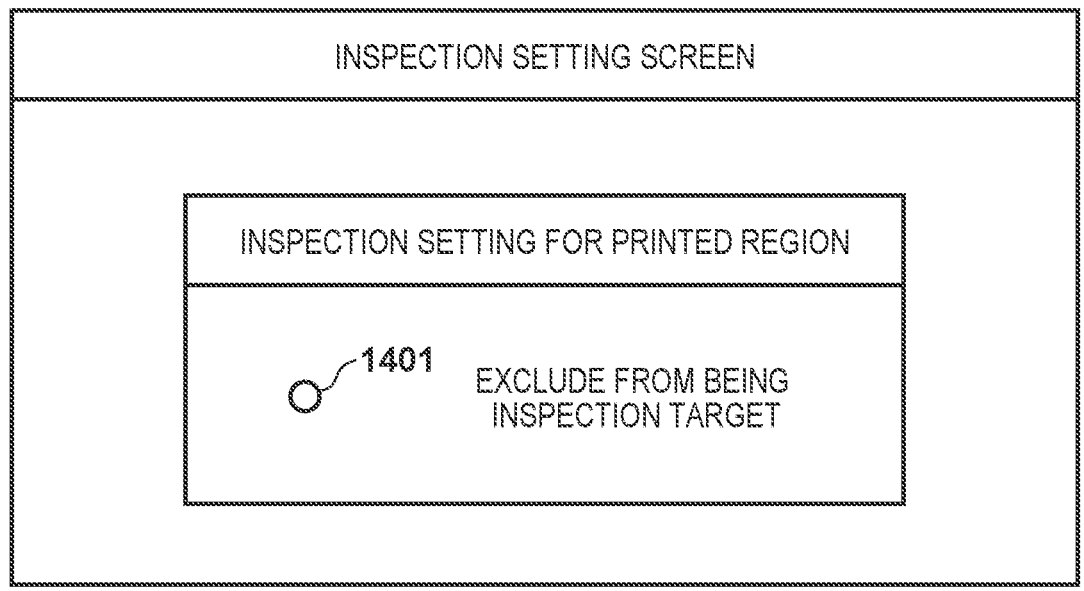
FIG. 14 depicts a view illustrating an example of a screen in which an inspection setting for a sheet including a printed region in which contents do not coincide is set according to a variation of the first embodiment.

In the first embodiment, an example in which alignment by nonlinear transformation is performed only in regions in which contents coincide has been described. However, processing that is switched depending on whether the contents coincide is not limited to only the alignment processing. As described above, in a case where the contents do not coincide, alignment by nonlinear transformation cannot be performed, and inspection is performed in a state in which the alignment accuracy is low, and so, the rate of erroneous inspection increases. Therefore, in the inspection parameter setting of step S601 of FIG. 6, a UI as illustrated in FIG. 14, for example, is displayed. A configuration may be taken such that in a case that a sheet used for printing includes a printed region, it is made possible to select whether to perform inspection of the printed region in which the contents do not coincide in order to reduce a decrease in productivity. A configuration may also be taken such that in a case that the user emphasizes productivity, for example, a region in which the contents do not coincide may be automatically excluded from being an inspection target.

FIG. 14 is a diagram illustrating an example of a screen in which an inspection setting for a sheet including a printed region in which contents do not coincide is set according to a variation of the first embodiment.

Here, a check button 1401 is provided, and when the check button 1401 is checked, if a sheet used for printing includes a printed region, a printed image region can be designated to be excluded from being an inspection target.

By thus excluding a printed region in which contents do not coincide from being an inspection target, the processing for determining whether contents coincide can be simplified. That is, although the reference image and the inspection target image are divided into a plurality of regions, and it is determined whether contents coincide for each region, the regions in which the determination is performed can be set to regions other than the printed region. Alternatively, a configuration may be taken such that in a case where a printing medium used for printing includes a printed region, it is determined that contents of an inspection target image obtained from the printing medium does not coincide with that of a reference image. This makes it possible to simplify the processing for determining whether contents coincide.

In the first embodiment, an example in which the processing for determining whether contents coincide is performed for all the pages in a print job at the beginning of the inspection processing performed by the inspection apparatus 105 has been described. However, a timing at which it is determined whether contents coincide is not limited to the above described example. For example, in most cases, printing media (sheets) having the same printed pattern conditions are set in one paper feeder. Therefore, it may be determined whether contents coincide only for a first page of a print job. A result of the determination as to whether contents coincide may be re-used until there is an instruction for changing settings for the sheets set in the paper feeder from the user.

Second Embodiment

In the following, points different from the first embodiment will be described. In the first embodiment, an example in which the processing for determining whether contents coincide is performed at the beginning of the inspection processing performed by the inspection apparatus 105 has been described. However, the configuration of the present invention is not limited to the above-described example. As described above, the smaller the region for contents determination, the more accurate the determination as to whether contents coincide; however, the print product productivity decreases. Therefore, in the second embodiment, when printing in which printing media (sheets) having the same printed pattern conditions are used is continued, it is determined whether contents coincide with high accuracy and without the productivity decreasing. For this, an example in which it is determined whether contents coincide as inspection parameter setting processing prior to print job execution will be described. In the second embodiment, in step S601 in which inspection parameters are set, pre-inspection is performed prior to input of a print job, based on a blank sheet inspection target image on which blank data has been printed, and it is determined whether contents coincide. A difference from the above-described first embodiment is in that in step S601 in which inspection settings necessary for inspection are set prior to inspection processing, it is determined whether contents coincide, and a result of that determination is held in the RAM 107. Hardware configurations and the like of the printing apparatus 102 and the inspection apparatus 105 according to the second embodiment are similar to those of the above-described first embodiment, and so descriptions thereof will be omitted.

Figure 15:
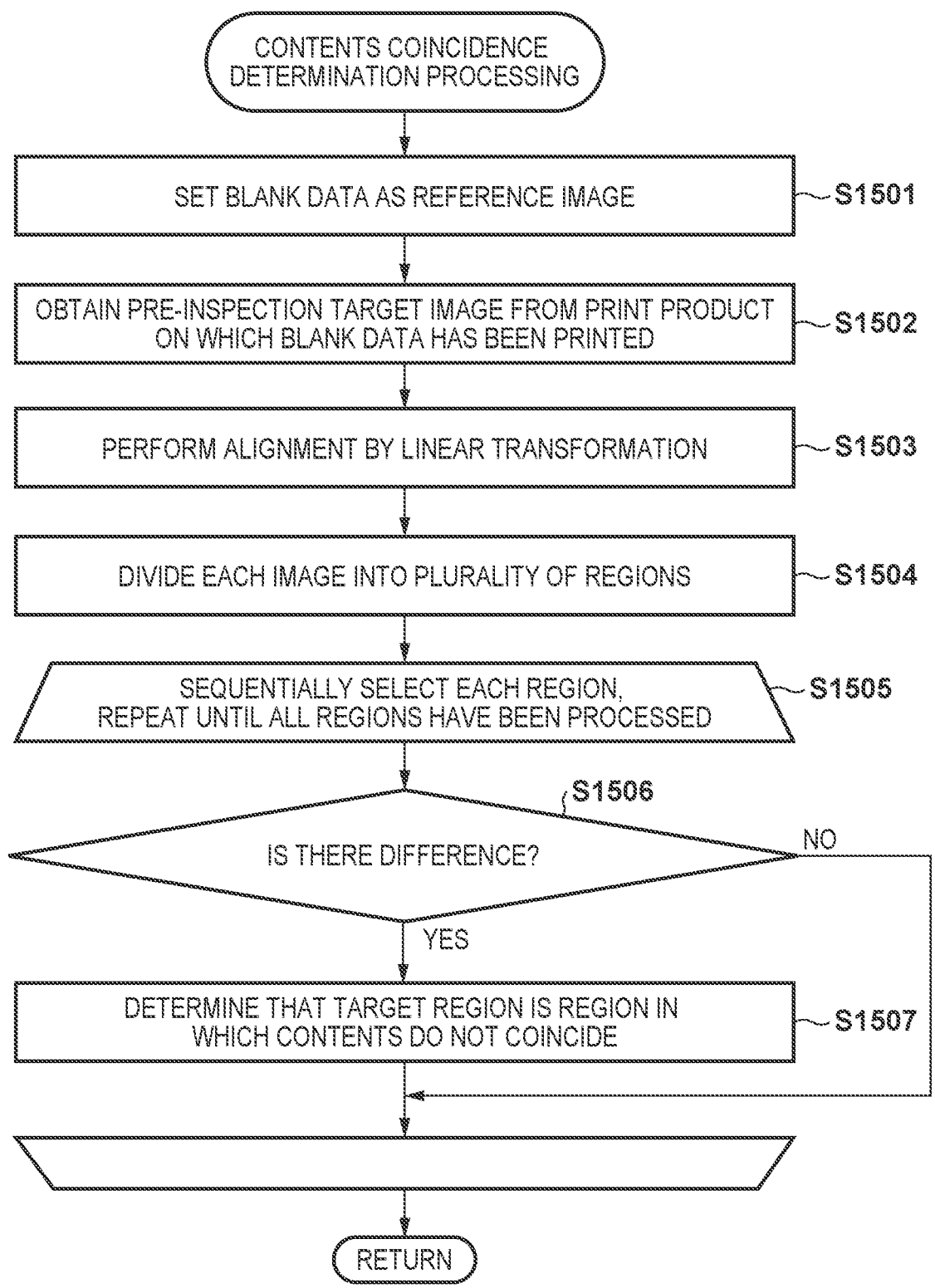
FIG. 15 is a flowchart for explaining processing for determining whether contents coincide by the inspection apparatus according to a second embodiment of the present invention.

FIG. 15 is a flowchart for explaining processing for determining whether contents coincide by the inspection apparatus 105 according to the second embodiment of the present invention.

First, the CPU 106 sets blank data as a reference image for pre-inspection. The blank data is data in which all the pixels included in the data are of a pixel value indicating that image formation by color agents is not to be performed. For example, when 8-bit data is used, image data in which RGB=(255, 255, 255) indicating white are set to all the pixels is set as blank data. Next, the processing proceeds to step S1502, and the CPU 106 obtains an inspection target image for pre-inspection by the image reader 110 reading a print product on which printing has been performed on a sheet by the printing apparatus 102 based on the blank data (reference image). Then, the processing proceeds to step S1503, and the CPU 106 aligns the reference image set in step S1501 and the inspection target image for pre-inspection obtained in step S1502 by the above-described alignment processing by linear transformation. Next, the processing proceeds to step S1504, and the CPU 106 divides each image into a plurality of regions as in step S1002 of FIG. 10. In the second embodiment, contents coincidence determination processing is performed when inspection settings are set before the print processing is started. Therefore, unlike the above-described first embodiment, the processing time according to the contents coincidence determination processing does not affect the productivity of products printed by the print processing. In view of the above, it is desirable that the size of regions is determined in consideration of sheet unevenness. For example, when the size of regions is determined, it is desirable that the size is such that a difference between representative values due to unevenness in the whiteness of a sheet is reduced.

Next, the processing proceeds to step S1505, and the CPU 106 functions as the contents coincidence determining module 204 and sequentially selects each region and, in step S1506, determines whether the contents of the reference image and the inspection target image coincide in the selected region.

Figure 16:
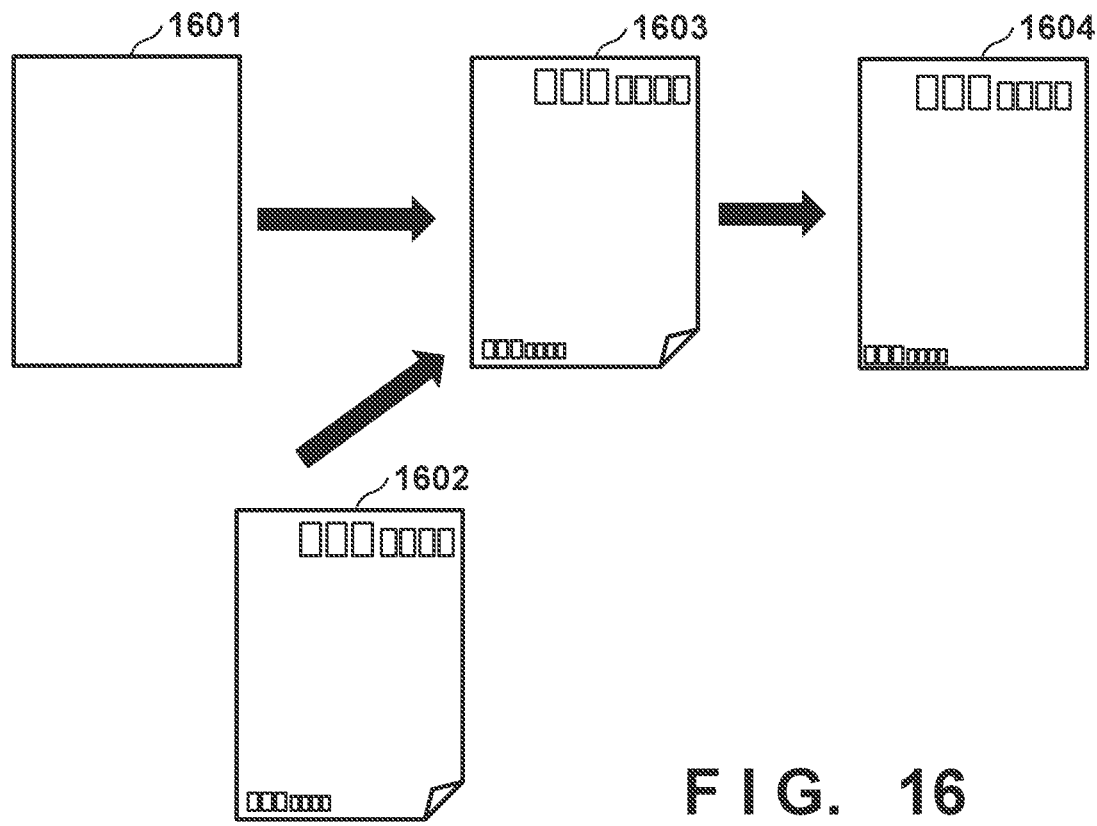
FIG. 16 is a schematic diagram in which a reference image and an inspection target image are compared by pre-inspection according to the second embodiment.
Figure 17:
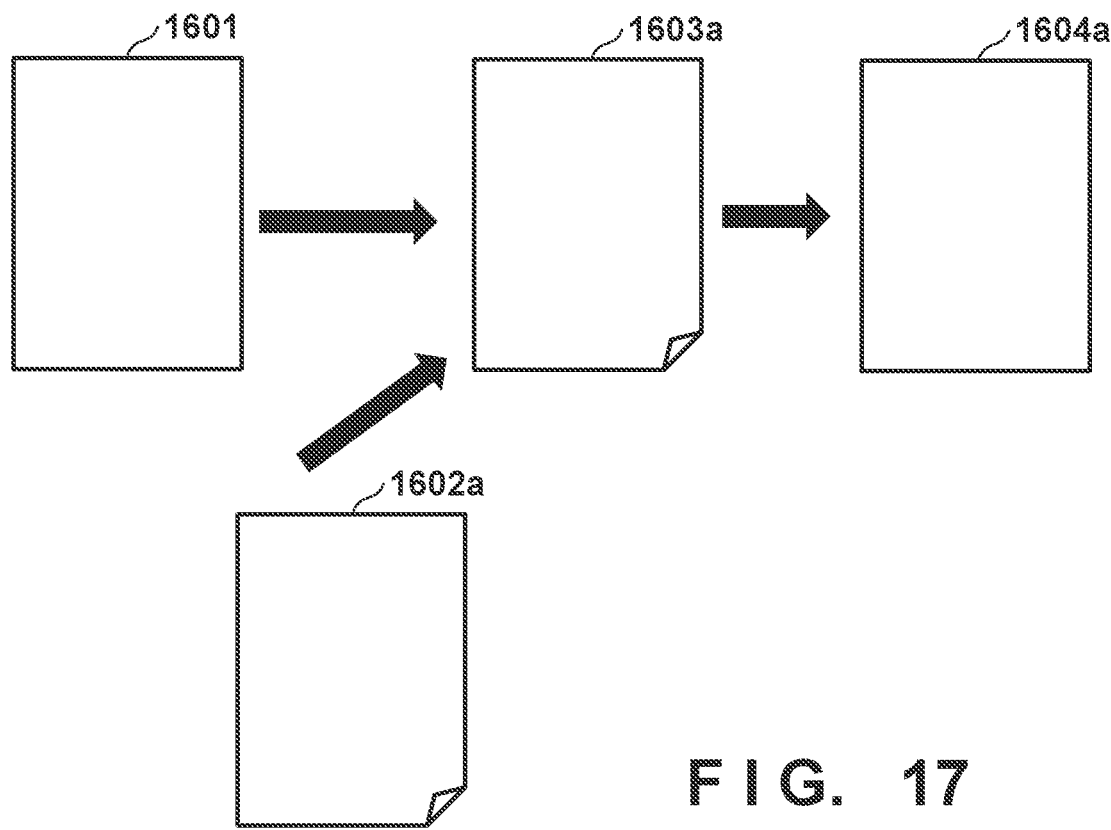
FIG. 17 is a schematic diagram in which a reference image and an inspection target image are compared by pre-inspection according to the second embodiment.

FIGS. 16 and 17 are diagrams illustrating schematic diagrams in which the reference image and the inspection target image are compared according to pre-inspection.

In FIG. 16, reference numeral 1601 is blank data, and a sheet 1602 is a sheet on which the blank data 1601 is to be printed, and a sheet 1603 indicates a print product generated by the printing apparatus 102 printing the blank data 1601 on the sheet 1602. A scanned image 1604 indicates image data obtained by the image reader 110 reading the print product 1603. FIG. 16 illustrates an example in which there is a printed pattern on the sheet 1602 used for printing. In FIG. 17, the reference numeral 1601 is blank data, and a sheet 1602a is a sheet on which the blank data 1601 is to be printed, and a sheet 1603a indicates a print product generated by the printing apparatus 102 printing the blank data 1601 on the sheet 1602a. A scanned image 1604a indicates image data obtained by the image reader 110 reading the print product 1603a, FIG. 17 illustrates an example in which there is no printed pattern on the sheet 1602a used for printing.

As described in step S1501, the blank data 1601 consists of pixel values for which image forming by coloring agents is not performed. Therefore, regarding the above-described inspection target image 1604 for pre-inspection, a difference between the reference data (blank data 1601) and the inspection target image 1604 is smaller in a region in which there is no printed pattern than in a region in which there is a printed pattern on the sheet 1602 set in the paper feeder. That is, it can be determined that contents are different in a region in which a difference between representative values of regions is large. A region in which it has thus been determined that contents do not coincide is held in the RAM 107 as binary data (step S1507). Here, for example, "1" is set for a region in which a determination result is that contents coincide, "0" is set for a region in which it has been determined that contents do not coincide. Thus, similarly to step S1003, regions are sequentially selected, and step S1505 to step S1507 are repeatedly performed until determination for all the regions is complete. When all of the regions have thus been selected and determined, the contents determination processing ends, and the entire process of step S601 completely ends.

Furthermore, in the alignment processing of FIG. 10 corresponding to step S606 of FIG. 6 in the second embodiment, the processing is switched upon the contents coincidence determination results held in the RAM 107 being referenced. That is, in step S1004 in the alignment processing, a pre-inspection determination result corresponding to the selected region is referenced, and when the determination result is "1" (contents coincide), the processing proceeds to step S1005, the region is set to be a target of alignment by nonlinear transformation and the control points are arranged; otherwise, the processing proceeds to step S1003, and the next region is selected.

As described above, by virtue of the second embodiment, when printing in which printing media having the same printed pattern conditions are used is continued, it is determined whether contents coincide by performing pre-inspection prior to an execution of a print job to set inspection settings for the print job. This makes it possible to accurately determine whether contents coincide without productivity decreasing.

Variation of Second Embodiment

Figure 18:
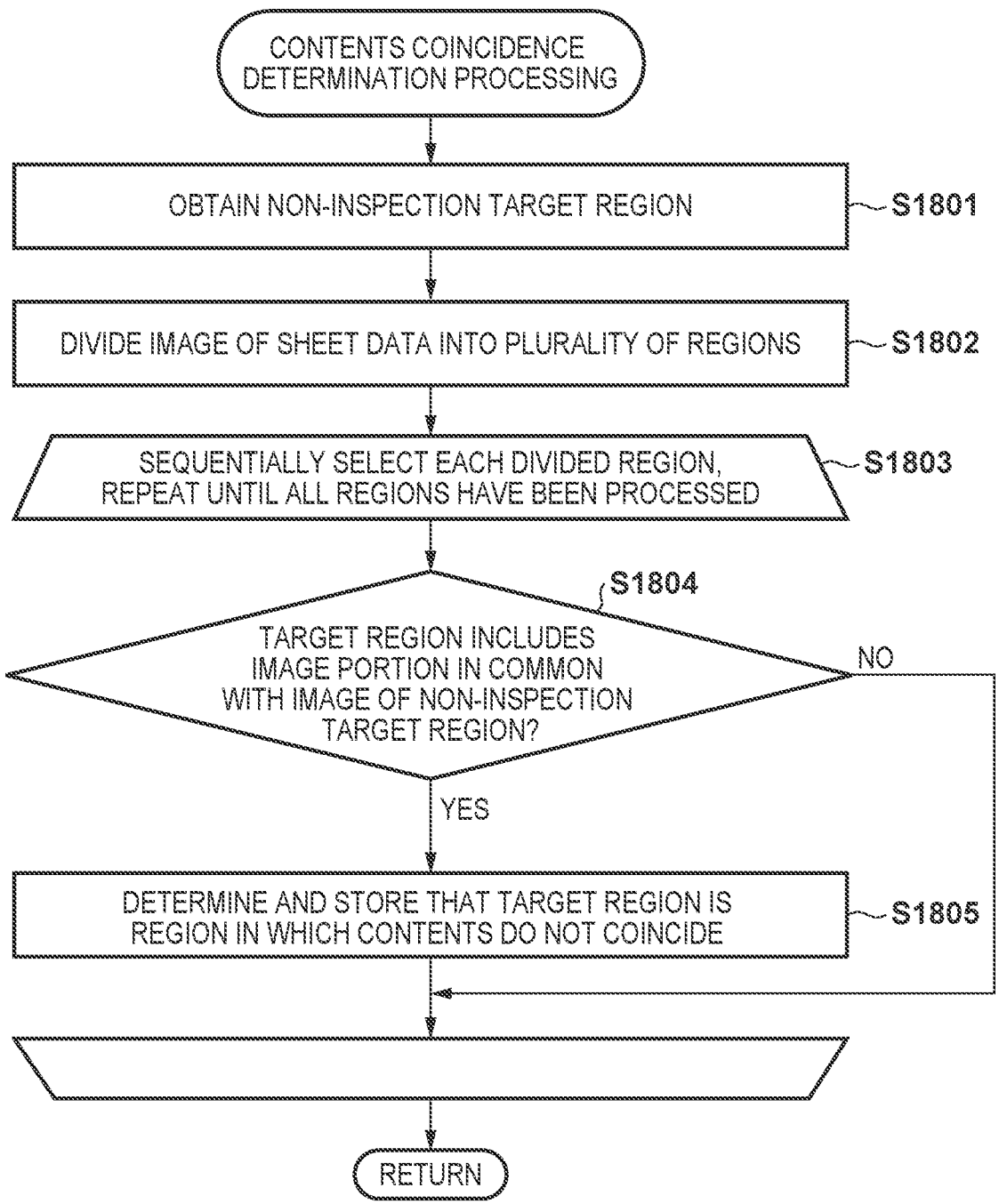
FIG. 18 is a flowchart for explaining processing for determining whether contents coincide by the inspection apparatus according to a variation of the second embodiment of the present invention.

In the above-described second embodiment, an example in which pre-inspection is performed based on a blank reference image and, based on a result of the pre-inspection, it is determined whether contents coincide between an inspection target image and the reference image has been described. However, when printing in which printing media having the same printed pattern conditions are used is continued, a method of determining contents coincidence is not limited to the above-described example. Therefore, as a variation of the second embodiment, contents coincidence determination processing in a case where the user can designate a non-inspection target region on a UI will be described. A non-inspection target region is a region in which inspection cannot be performed due to a pattern included in an inspection target image not being included in a reference image. Therefore, a non-inspection target region can be regarded as a region in which contents do not coincide. Therefore, it is necessary that control be performed such that the above-described control points are not arranged in an inspection image region corresponding to a non-inspection target region. The procedure of contents coincidence determination processing according to the variation of the second embodiment is illustrated in FIG. 18. The following describes points of difference from the second embodiment.

FIG. 18 is a flowchart for explaining processing for setting a non-inspection target region by the inspection apparatus 105 according to the variation of the second embodiment of the present invention. In the processing described in this flowchart, the CPU 106 executes the processing by functioning as the contents coincidence determining module 204.

First, in step S1801, the CPU 106 obtains an image included in a non-inspection target region set by the user. As a method for the user to set a non-inspection target region, for example, a UI such as the one illustrated in FIG. 19 is displayed on a UI panel, and the user performs setting by operating the UI.

Figure 19:
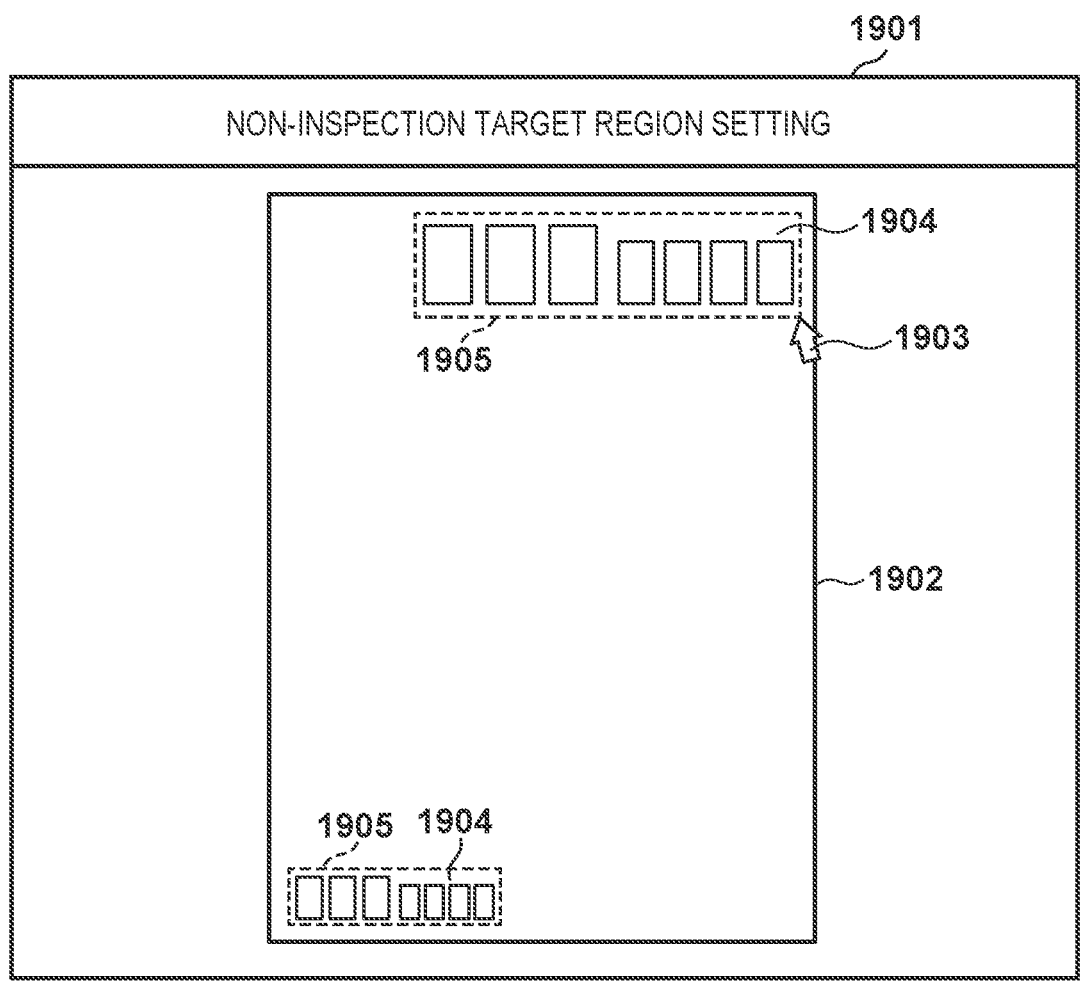
FIG. 19 is a diagram illustrating an example of a UI screen for setting a non-inspection target region to be displayed on the operation panel of the inspection apparatus according to the variation of the second embodiment.

FIG. 19 is a diagram illustrating an example of a UI screen for setting a non-inspection target region to be displayed on the operation panel 113 of the inspection apparatus 105 according to the variation of the second embodiment.

In this UI screen, data 1902 of a sheet on which an image is to be printed is displayed on a non-inspection target region setting window 1901. The user surrounds with a rectangle 1905 a printed pattern 1904 (in the example of the figure, a postal code field) that they wish to set as a non-inspection target region by operating the operation panel 113 and performing a drag/drop operation of a cursor 1903 and sets the rectangle 1905 as a non-inspection target region.

Next, the processing proceeds to step S1802, and the CPU 106 divides the sheet data 1902 into a plurality of regions. Then, the processing proceeds to step S1803, and the CPU 106 sequentially selects each region of the plurality of regions. Then, in step S1804, the CPU 106 determines whether the selected region includes an image portion in common with an image of the non-inspection target region. In a case where it is determined that there is a common image portion, the processing proceeds to step S1805, and the CPU 106 determines that the region is to be excluded from being an inspection target. Then, a result of that determination is held in the RAM 107 as binary data. For example, "0" is set for a region that has been determined to include an image portion in common with an image of the non-inspection target region as a result of the determination of step S1804, and "1" is set for other regions, that is, regions to be inspected. In this way, these processes are performed sequentially on the plurality of regions of the sheet data 1902 and are repeated until determination of all the regions is complete. When all the regions have thus been selected and determined, the contents coincidence determination processing ends, and the entire process ends.

With this processing, it is possible to determine whether an image of a non-inspection target region is included for each of a plurality of regions in which control points are to be arranged and, when the image of the non-inspection target region is included, set the region to be excluded from being an inspection target and not arrange control points.

Accordingly, in the above-described alignment processing indicated in FIG. 10, in step S1004, the above-described value in the RAM 107 is referenced, and it is determined whether the value in the RAM 107 corresponding to the region is "0", that is, the region includes a portion in common with the non-inspection target region. Then, if the region is to be excluded from being an inspection target, it is determined that the region is not a region in which control points are to be arranged, and step S1005 is skipped. This makes it possible to perform alignment in which control points are used, only in regions in which contents coincide.

FIG. 20 is a schematic diagram illustrating an example in which an image of a region in which contents do not coincide and a non-inspection target region designated by a user are included in a reference image and an inspection target image according to the variation of the second embodiment.

Similarly to above-described FIG. 3, the image 301 indicates image data (a reference image) included in print job data, and the sheet 302a indicates a sheet on which an image is to be printed. The print product 303a indicates a print product obtained by the image 301 being printed on the sheet 302a. Furthermore, the scanned image 304a indicates image data obtained by the image reader 110 reading the print product 303a. Here, the image 301 does not include the contents 3021 and 3022 included in the sheet 302a. These contents are designated by the user as non-inspection target regions 20021 and 20022 in step S1801 as described with reference to FIG. 19. Then, according to the determination processing of step S1804, it is determined that contents do not coincide for regions 20041 and 20042 of the scanned image 304a in which contents 3042 and 3043 corresponding to the non-inspection target regions 20021 and 20022 are included, and the regions 20041 and 20042 are excluded from being regions in which control points are to be arranged.

By the user designating a non-inspection target region on an UI and contents being determined to not coincide in the designated non-inspection target region with the above configuration, it is possible to more accurately determine contents coincidence and prevent control points from being arranged in a region corresponding to the non-inspection target region. This makes it possible to improve the accuracy of alignment the free-form deformation and prevent erroneous inspection from occurring.

In the above-described variation of the second embodiment, an image of sheet data is divided into a plurality of regions, and for each region, it is determined whether an image of a non-inspection target region designated by the user is included. However, it may be determined whether each region of an inspection target image corresponds to the non-inspection target region using coordinate information of the non-inspection target region designated by the user.

In addition, in a case where sheet data includes a plurality of images to be non-inspection target regions, which are in common with each other, the user selects a region including one of the common images as a non-inspection target region. Then, another region, which includes a common image and is included in the sheet data, may also be determined as a non-inspection target region by the above-described processing indicated in the flowchart of FIG. 18 being executed.

Other Embodiments

In the above-described first and second embodiments, examples in which it is determined whether contents coincide for each region, and whether to arrange the control points is switched based on a result of the determination has been described. However, a method of determining a determination result for each region is not limited to the above example. A configuration may be taken so as to perform determination in consideration of not only a determination result for each region but also a determination result of peripheral regions of the region. For example, a region adjacent to a region for which it has been determined that contents are the same may be determined as a region for which the contents are the same, and when the number of regions for which contents coincide is greater than a predetermined number, it may be determined that contents of two images coincide. Further, as a method of determining the number of regions for which contents are the same, a known connection labeling process may be performed on binary data for whether contents coincide for each region, and the number of regions that are determined to have the "same" label may be referred to.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefits of Japanese Patent Application No. 2022-116578, filed Jul. 21, 2022, and Japanese Patent Application No. 2023-080923, filed May 16, 2023, which are hereby incorporated by references herein in their entirety.

What is claimed is:

1. An inspection apparatus operable to read an image formed on a printing medium by a printing apparatus and inspect the read image, the inspection apparatus comprising:
one or more memories storing instructions; and
one or more processors that execute the instructions to:
store image data used for forming an image on a printing medium as a reference image;
obtain image data of the image formed on the printing medium;
align the inspection target image and the reference image by a linear transformation;
divide the aligned inspection target image and the aligned reference image into a plurality of regions to determine whether contents of corresponding regions of the aligned inspection target image and the aligned reference image coincide;
in a case where it is determined that a content of a region of the aligned inspection target image and a content of a corresponding region of the aligned reference image coincide, arrange a control point on the region of the aligned inspection target image and a control point on the corresponding region of the aligned reference image;

control the alignment of the aligned inspection target image and the aligned reference image by a nonlinear transformation that uses the control points arranged on the aligned inspection target image and the aligned reference image; and detect a defect in the inspection target image by comparing the inspection target image and reference image aligned by the nonlinear transformation.

2. The inspection apparatus according to claim 1, wherein the one or more processors further execute the instructions to determine whether contents of corresponding regions of the aligned inspection target image and the aligned reference image coincide, based on a difference between representative values based on luminance values of pixels included in the corresponding regions of the aligned inspection target image and the aligned reference image.

3. The inspection apparatus according to claim 2, wherein, in a case where the difference between representative values based on luminance values of pixels included in the corresponding regions of the aligned inspection target image and the aligned reference image is less than or equal to a threshold, the one or more processors further execute the instructions to determine that contents of the corresponding regions of the aligned inspection target image and the aligned reference image coincide, and in a case where there is a corresponding region in which the difference between the representative values exceeds the threshold, the one or more processors further execute the instructions to determine that the contents of the aligned inspection target image and the contents of the aligned reference image do not coincide and skip the nonlinear transformation.

4. The inspection apparatus according to claim 3, wherein, in a case where the number of regions in which the difference between the representative values is less than or equal to the threshold is greater than a predetermined number, the one or more processors further execute the instructions to determine that the contents of the inspection target image and the contents of the reference image coincide.

5. The inspection apparatus according to claim 3, wherein in the control, control is performed so as to perform the alignment processing by the nonlinear transformation in a region in which the difference between the representative values is less than or equal to the threshold, and not to perform the alignment processing by the nonlinear transformation in a region in which the difference between the representative values exceeds the threshold.

6. The inspection apparatus according to claim 2, wherein the one or more processors further execute the instructions to:

designate whether to set an image region formed on a printing medium before the reference image is formed to be excluded from being an inspection target, wherein in the determination as to whether the contents of corresponding regions of the aligned inspection target image and the aligned reference image coincide, in a case where the image region is set to be excluded from being the inspection target, it is determined whether the contents of corresponding regions of the aligned inspection target image and the contents of the aligned reference image coincide based on a region other than the image region.

7. The inspection apparatus according to claim 1, wherein the one or more processors further execute the instructions to:

set a non-inspection target region for the image of the printing medium, wherein in the determination as to whether the contents of the corresponding regions coincide, the one or more processors further execute the instructions to determine whether the contents of corresponding regions of the aligned inspection target image and the aligned reference image coincide based on whether each region includes an image included in the non-inspection target region.

8. The inspection apparatus according to claim 7, wherein in the determination as to whether the contents of the corresponding regions coincide, the image of the printing medium is divided into a plurality of regions, and in a case where each region obtained by the division includes an image portion in common with the image included in the non-inspection target region, the one or more processors further execute the instructions to determine that each region corresponds to the non-inspection target region, and the one or more processors further execute the instructions to determine whether the contents of corresponding regions of the aligned inspection target image and the aligned reference image coincide based on whether each region obtained by dividing the aligned inspection target image into a plurality of regions is a region corresponding to the non-inspection target region.

9. The inspection apparatus according to claim 7, wherein the non-inspection target region includes an image region printed in advance on the printing medium.

10. The inspection apparatus according to claim 1, wherein in the control, in a case where it is determined that the contents of the aligned inspection target image and the contents of the aligned reference image do not coincide, control is performed so as not to perform the alignment processing by the nonlinear transformation.

11. The inspection apparatus according to claim 1, wherein the one or more processors further execute the instructions to:

obtain, from a reference image used for printing a chart and image data of an image of the chart, information on a distortion between the reference image and the image data.

12. The inspection apparatus according to claim 11, wherein in the alignment, in the alignment processing by the nonlinear transformation, coordinates of control points are obtained based on the information on the distortion such that a difference between corresponding control points of the aligned reference image and the aligned inspection target image is reduced.

13. The inspection apparatus according to claim 1, wherein the one or more processors further execute the instructions to:

set the reference image to be blank data; set image data of a printing medium on which the blank data has been formed, obtained in the image data obtainment, as an inspection target image; determine whether the contents of corresponding regions of the aligned inspection target image and the aligned reference image coincide based on a difference between representative values of corresponding regions of the aligned inspection target image and the aligned reference image; and execute pre-inspection in which a result of the determination is stored, wherein the pre-inspection is executed before the printing apparatus forms an image on a printing medium based on a print job.

14. The inspection apparatus according to claim 13, wherein the determination as to whether the content of a region of the aligned inspection target image and the content of a corresponding region of the aligned reference image coincide is performed based on the result of the determination, which is determined and stored according to the pre-inspection.

15. The inspection apparatus according to claim 1, wherein the determination as to whether the contents of corresponding regions of the aligned inspection target image and the aligned reference image coincide is performed at any of: for each page of a print job, at a first page of a print job, before a print job is inputted, and when a setting of a paper feeder is changed.

16. The inspection apparatus according to claim 1, wherein in the detection of the defect, a difference image for each pixel of the inspection target image and the reference image that are aligned by the nonlinear transformation is obtained, and in a case where a value for which the difference image has been binarized exceeds a defect determination threshold, it is detected that there is the defect in the inspection target image.

17. The inspection apparatus according to claim 16, wherein the one or more processors further execute the instructions to:
perform filter processing according to a type of the defect to be detected, on the difference image.

18. The inspection apparatus according to claim 17, wherein in the detection of the defect, the type of the defect, and coordinates of a position at which the defect is detected are further stored.

19. The inspection apparatus according to claim 18, wherein the one or more processors further execute the instructions to:
present to the user the type of defect detected by the detection of the defect and the coordinates of the position at which the defect is detected.

20. The inspection apparatus according to claim 1, wherein the nonlinear transformation includes any one of free-form deformation (FFD), thin plate splines (TPS), and a landmark LDDMM method.

21. A method of controlling an inspection apparatus operable to read an image formed on a printing medium by a printing apparatus and inspect the read image, the method comprising:
storing, in a memory, image data used for forming an image on a printing medium as a reference image;
obtaining image data of the image formed on a printing medium on which the reference image has been formed as an inspection target image;
aligning the inspection target image and the reference image by a linear transformation;
dividing the aligned inspection target image and the aligned reference image into a plurality of regions to determine whether contents of corresponding regions of the aligned inspection target image and the aligned reference image coincide;
in a case where it is determined that a content of a region of the aligned inspection target image and a content of a corresponding region of the aligned reference image coincide, arranging a control point on the region of the aligned inspection target image and a control point on the corresponding region of the aligned reference image;
controlling the alignment of the aligned inspection target image and the aligned reference image by a nonlinear transformation that uses the control points arranged on the aligned inspection target image and the aligned reference image; and
detecting a defect in the inspection target image by comparing the inspection target image and reference image aligned by the nonlinear transformation.

22. A non-transitory computer-readable storage medium storing a program for causing a processor to execute a method of controlling an inspection apparatus operable to read an image formed on a printing medium by a printing apparatus and inspect the read image, the method comprising:
storing, in a memory, image data used for forming an image on a printing medium as a reference image;
obtaining image data of the image formed on a printing medium on which the reference image has been formed as an inspection target image;
aligning the inspection target image and the reference image by a linear transformation;
dividing the aligned inspection target image and the aligned reference image into a plurality of regions to determine whether contents of corresponding regions of the aligned inspection target image and the aligned reference image coincide;
in a case where it is determined that a content of a region of the aligned inspection target image and a content of a corresponding region of the aligned reference image coincide, arranging a control point on the region of the aligned inspection target image and a control point on the corresponding region of the aligned reference image;
controlling the alignment of the aligned inspection target image and the aligned reference image by a nonlinear transformation that uses the control points arranged on the aligned inspection target image and the aligned reference image; and
detecting a defect in the inspection target image by comparing the inspection target image and reference image aligned by the nonlinear transformation.

* * * * *